(12) United States Patent
Agrawal et al.

(10) Patent No.: US 12,242,604 B2
(45) Date of Patent: Mar. 4, 2025

(54) METHOD FOR PREVENTING DATA LEAKAGE TO MACHINE LEARNING ENGINES AVAILABLE IN ELECTRONIC DEVICE

(71) Applicant: SAMSUNG ELECTRONICS CO., LTD., Suwon-si (KR)

(72) Inventors: Rahul Agrawal, Gwalior (IN); Vipul Gupta, Hisar (IN); Saurabh Kumar, Patna Sahib (IN); Ankur Agrawal, Agra (IN); Nitesh Goyal, Ghaziabad (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 500 days.

(21) Appl. No.: 17/566,369

(22) Filed: Dec. 30, 2021

(65) Prior Publication Data

US 2022/0198006 A1 Jun. 23, 2022

Related U.S. Application Data

(63) Continuation of application No. PCT/KR2021/018542, filed on Dec. 8, 2021.

(30) Foreign Application Priority Data

Dec. 18, 2020 (IN) .............................. 202041055130

(51) Int. Cl.
*G06F 21/55* (2013.01)
*G06N 20/00* (2019.01)

(52) U.S. Cl.
CPC ........... *G06F 21/556* (2013.01); *G06N 20/00* (2019.01); *G06F 2221/034* (2013.01)

(58) Field of Classification Search
CPC . H04L 9/50; H04L 9/008; H04L 63/10; H04L 63/102; H04L 63/104;
(Continued)

(56) References Cited

U.S. PATENT DOCUMENTS 9,569,771 B2 2/2017 Lesavich et al.
2016/0267396 A1* 9/2016 Gray ...................... G06N 20/00
(Continued)

FOREIGN PATENT DOCUMENTS

CN 107704930 A 2/2018
CN 109729168 A 5/2019
(Continued)

OTHER PUBLICATIONS

International Search Report dated Mar. 25, 2022 issued by the International Searching Authority in International Application No. PCT/KR2021/018542 (PCT/ISA/220, PCT/ISA/210, and PCT/ISA/237).

(Continued)

*Primary Examiner* — Tae K Kim
(74) *Attorney, Agent, or Firm* — Sughrue Mion, PLLC

(57) ABSTRACT

A method for preventing data leakage may include: identifying data that is generated by at least one framework application in response to a data request from a first machine learning (ML) engine of a plurality of ML engines; creating a plurality of data blocks based on the generated data, a category of the first ML engine, and a tag associated with the first ML engine and the at least one framework application; determining whether the plurality of data blocks are valid to share with the first ML engine using an activity block chain associated with each of the plurality of framework applications; based on the plurality of data blocks being valid, sharing the plurality of data blocks with the first ML engine, (Continued)

and otherwise discarding the plurality of data blocks not to share with the first ML engine.

20 Claims, 25 Drawing Sheets

(58) Field of Classification Search
CPC ... H04L 63/105; G06F 21/6245; G06F 21/62; G06F 21/6218; G06F 21/6227; G06F 21/6254; G06F 21/6281; G06N 20/00; G06N 3/08
See application file for complete search history.

(56) References Cited

U.S. PATENT DOCUMENTS

| | | | |
|---|---|---|---|
| 2016/0300252 A1* | 10/2016 | Frank | G06F 21/6245 |
| 2017/0046652 A1 | 2/2017 | Haldenby et al. | |
| 2017/0103167 A1* | 4/2017 | Shah | G06Q 10/101 |
| 2017/0221032 A1 | 8/2017 | Mazed | |
| 2018/0089591 A1* | 3/2018 | Zeiler | G06F 3/048 |
| 2018/0285839 A1* | 10/2018 | Yang | G06Q 20/40 |
| 2018/0302222 A1* | 10/2018 | Agrawal | H04W 4/70 |
| 2019/0050584 A1* | 2/2019 | Zhang | H04L 63/104 |
| 2019/0050854 A1 | 2/2019 | Yang et al. | |
| 2019/0065974 A1 | 2/2019 | Michigami | |
| 2019/0087691 A1* | 3/2019 | Jelveh | G06N 3/084 |
| 2019/0311153 A1* | 10/2019 | Hollinger | G06F 16/955 |
| 2020/0082259 A1* | 3/2020 | Gu | G06N 3/08 |
| 2020/0104636 A1* | 4/2020 | Halevi | G06F 18/211 |
| 2020/0186527 A1* | 6/2020 | Delson | H04L 63/0428 |
| 2020/0218940 A1* | 7/2020 | Anglin | H04L 9/0637 |
| 2020/0236143 A1* | 7/2020 | Zou | G06F 21/1078 |
| 2020/0242508 A1* | 7/2020 | Royo Bonnin | G06F 16/182 |
| 2020/0285978 A1 | 9/2020 | Chen et al. | |
| 2020/0311583 A1* | 10/2020 | Manamohan | G06N 20/00 |
| 2020/0349467 A1 | 11/2020 | Teague | |
| 2020/0351310 A1* | 11/2020 | Leighton | G06N 20/00 |
| 2020/0394334 A1* | 12/2020 | Bulut | G06N 5/048 |
| 2021/0182660 A1* | 6/2021 | Amirguliyev | G06N 3/084 |
| 2022/0150057 A1* | 5/2022 | Yang | H04L 9/007 |
| 2022/0414237 A1* | 12/2022 | Lally | G06N 20/00 |
| 2023/0153413 A1* | 5/2023 | Karlsson | G06F 21/335 726/4 |

FOREIGN PATENT DOCUMENTS

| | | |
|---|---|---|
| CN | 110858253 A | 3/2020 |
| CN | 111639916 A | 9/2020 |
| CN | 111931242 A | 11/2020 |
| EP | 3 839 790 A1 | 6/2021 |
| JP | 6695595 B2 | 5/2020 |
| KR | 10-2004948 B1 | 7/2019 |
| KR | 10-2019-0117829 A | 10/2019 |

OTHER PUBLICATIONS

Jamie Hanlon, "Why is so Much Memory Needed for Deep Neural Networks", Machine Learning, Jan. 31, 2017, pp. 1-5 (5 pages, total).
Communication issued Jul. 13, 2022 by Intellectual Property India in Indian Patent Application No. 202041055130.
Communication issued on Jan. 4, 2024 by the European Patent Office for European Patent Application No. 21906967.1.

* cited by examiner

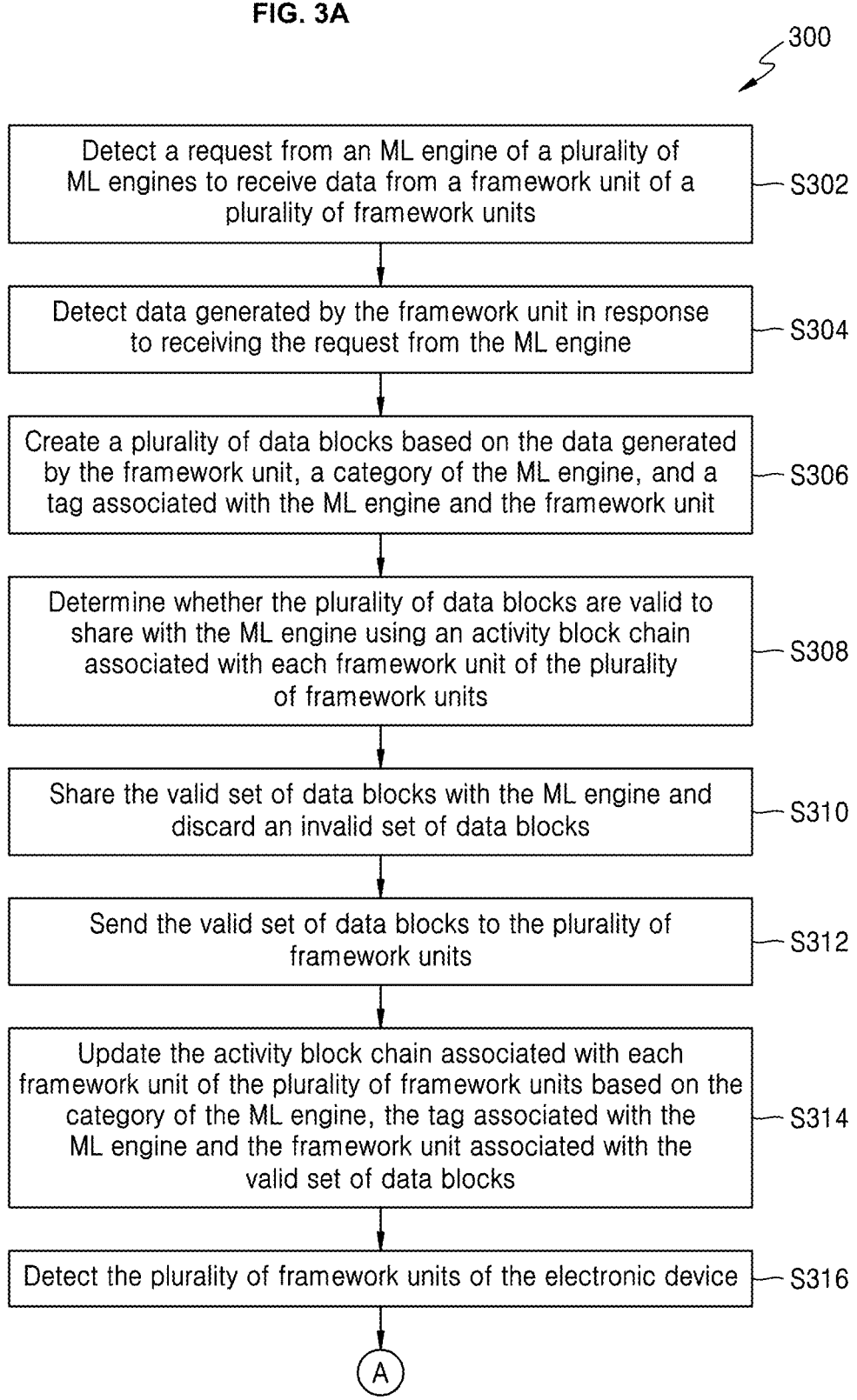

METHOD FOR PREVENTING DATA LEAKAGE TO MACHINE LEARNING ENGINES AVAILABLE IN ELECTRONIC DEVICE

CROSS-REFERENCE TO RELATED APPLICATIONS

This application is a bypass continuation application of International Application No. PCT/KR2021/018542, filed on Dec. 8, 2021, which is based on and claims priority to Indian Patent Application No. 202041055130, filed on Dec. 18, 2020, in the Indian Patent Office, the disclosures of which are incorporated by reference herein in their entirety.

BACKGROUND

1. Field

The present disclosure relates to a data leakage prevention method in an electronic device, and more specifically related to a method for preventing data leakage to machine learning ML engines available in an electronic device.

2. Description of Related Art

With a large number of machine learning (ML) engines being used in an electronic device for various purposes such as social networking purpose, educational purpose, and the like, investigators often obtain user data including their physiological and/or biometric data through indirect intervention. The indirect intervention to fetch data causes the electronic device to even learn that the fetch data contain sensitive security information. In an example, the ML engine reads all the transactions of the user of the electronic device and will provide offers related to user's transactions in the past. Hence, the security of users' personal data may have been compromised as ML engine uses the users' personal data without knowledge of the users.

SUMMARY

One or more embodiments of the disclosure provide a method for preventing data leakage to ML engines installed in or operated by an electronic device.

Further, one or more embodiments of the disclosure provide a block chain interface on each framework unit interacting directly with a ML engine to enhance data security and to allow a user to control over his/her data.

Further, one or more embodiments of the disclosure provide a method and an electronic device for sharing data extracted by a first ML engine with a second ML engine for training the second ML engine, to prevent similar data from being extracted multiple times in the electronic device to train the second ML engine in the same category as the first ML engine. Accordingly, the method and the electronic device according to embodiments may prevent extra resource usage for training similar ML engines.

According to an aspect of the disclosure, a method for preventing data leakage in an electronic device, may include: detecting a data request from a first machine learning (ML) engine of a plurality of ML engines that requests at least one framework application of a plurality of framework applications to provide data; identifying the data that is generated by the at least one framework application in response to the data request from the first ML engine; creating a plurality of data blocks based on the data generated by the at least one framework application, a first category of the first ML engine, and a first tag associated with the first ML engine and the at least one framework application; determining whether the plurality of data blocks are valid to share with the first ML engine using an activity block chain associated with each of the plurality of framework applications; based on the plurality of data blocks being valid, sharing the plurality of data blocks with the first ML engine, as a valid set of data blocks; and based on the plurality of data blocks not being valid, discarding the plurality of data blocks, as an invalid set of data blocks, not to be shared with the first ML engine.

The method may further include: based on the plurality of data blocks being valid, sending the valid set of data blocks to the plurality of framework applications; and updating the activity block chain associated with each of the plurality of framework applications based on the first category of the first ML engine, the first tag associated with the first ML engine and the at least one framework application associated with the valid set of data blocks.

The method may further include creating the activity block chain associated with each of the plurality of framework applications. The creating the activity block chain may include: categorizing the first ML engine into the first category based on a communication pattern between each of the plurality of ML engines and the at least one framework application; detecting a type of data exchange between the first ML engine and the at least one framework application associated with the first category; generating at least one tag for each ML engine belonging to the first category, among the plurality of ML engines, based on the type of the data exchange between the first ML engine and the at least one framework application associated with the first category; and creating the activity block chain associated with each of the plurality of framework applications based on the first category, the type of the data exchange between the first ML engine and the at least one framework application associated with the first category, and actual data allowed between the first ML engine and the at least one framework application associated with the first category.

The categorizing the first ML engine into the first category based on the communication pattern between each of the plurality of ML engines and the at least one framework application may include: detecting the plurality of framework applications installed on the electronic device; detecting the communication pattern between each of the plurality of ML engines and the at least one framework application; monitoring the communication pattern between the first ML engine and the at least one framework application; and categorizing the first ML engine having the same communication pattern with the at least one framework application into the first category.

The creating the activity block chain associated with each of the plurality of framework applications based on the first category, the type of the data exchange between the first ML engine and the at least one framework application associated with the first category, and the actual data allowed between the first ML engine and the at least one framework application associated with the first category may include: creating a category block chain based on the first category; creating a micro block chain based on the type of the data exchange between the ML engine and the at least one framework application associated with the first category, and the actual data allowed between the first ML engine and the at least one framework application associated with the first category; and creating the activity block chain based on the category block chain and the micro block chain.

The data generated by the at least one framework application may be stored in the micro block chain by encrypting the data and storing, in a memory of the electronic device, the encrypted data in association with the micro block chain using a pointer.

The determining whether the plurality of data blocks are valid may include: receiving at least one response from a user that allows data sharing with the first ML engine; creating a ML model to predict a user response regarding the data sharing by training the ML model using a parameter for sharing the data with the plurality of ML engines; automatically creating a user signature from the created ML model; generating a signed block including a private key based on the user signature; and determining whether the plurality of data blocks are valid to share with the first ML engine using the activity block chain associated with each of the plurality of framework applications based on the generated signed block.

The parameter may include at least one of a hash value, a process associated with the first ML engine, the user signature, storage information and time stamp.

The plurality of framework applications may be configured to access and control other applications installed on the electronic device.

The plurality of framework applications may include a notification management application, an activity management application, and a resource management application.

The category block chain may include a plurality of category blocks indicating category information of each of the plurality of ML engines associated with the at least one framework application.

Each block of the category block chain may act as a root to the activity block chain.

According to another aspect of the disclosure, an electronic device may include: a memory storing instructions; and one or more processors configured to execute the instructions to: detect a data request from a first machine learning (ML) engine of a plurality of ML engines that requests at least one framework application of a plurality of framework applications to provide data, identify the data that is generated by the at least one framework application in response to the data request from the first ML engine, create a plurality of data blocks based on the data generated by the at least one framework application, a first category of the first ML engine, and a first tag associated with the first ML engine and the at least one framework application, determine whether the plurality of data blocks are valid to share with the first ML engine using an activity block chain associated with each of the plurality of framework applications, based on the plurality of data blocks being valid, share the plurality of data blocks with the first ML engine, as a valid set of data blocks; and based on the plurality of data blocks not being valid, discard the plurality of data blocks, an invalid set of data blocks not to be shared with the first ML engine.

The one or more processors may be further configured to: based on the plurality of data blocks being valid, send the valid set of data blocks to the plurality of framework applications; and update the activity block chain associated with each of the plurality of framework applications based on the first category of the first ML engine, the first tag associated with the first ML engine and the at least one framework application associated with the valid set of data blocks.

The one or more processors may be further configured to: categorize the first ML engine into the first category based on a communication pattern between each of the plurality of ML engines and the at least one framework application; detect a type of data exchange between the first ML engine and the at least one framework application associated with the first category; generate at least one tag for each ML engine belonging to the first category, among the plurality of ML engines, based on the type of the data exchange between the first ML engine and the at least one framework application associated with the first category; and create the activity block chain associated with each of the plurality of framework applications based on the first category, the type of the data exchange between the first ML engine and the at least one framework application associated with the first category, and actual data allowed between the first ML engine and the at least one framework application associated with the first category.

The one or more processors may be further configured to: detect the plurality of framework applications installed on the electronic device; detect the communication pattern between each of the plurality of ML engines and the at least one framework application; monitor the communication pattern between the first ML engine and the at least one framework application; and categorize the first ML engine having the same communication pattern with the at least one framework application into the first category.

The one or more processors may be further configured to: create a category block chain based on the first category; create a micro block chain based on the type of the data exchange between the ML engine and the at least one framework application associated with the first category, and the actual data allowed between the first ML engine and the at least one framework application associated with the first category; and create the activity block chain based on the category block chain and the micro block chain.

The data generated by the at least one framework application may be stored in the micro block chain by encrypting the data and storing, in the memory, the encrypted data in association with the micro block chain using a pointer.

The one or more processors may be further configured to: receive at least one response from a user that allows data sharing with the first ML engine; create a ML model to predict a user response regarding the data sharing by training the ML model using a parameter for sharing the data with the plurality of ML engines; automatically create a user signature from the created ML model; generate a signed block including a private key based on the user signature; and determine whether the plurality of data blocks are valid to share with the first ML engine using the activity block chain associated with each of the plurality of framework applications based on the generated signed block.

The parameter may include at least one of a hash value, a process associated with the first ML engine, the user signature, storage information and time stamp.

The plurality of framework applications may be configured to access and control other applications installed on the electronic device.

The plurality of framework applications may include a notification management application, an activity management application, and a resource management application.

The category block chain may include a plurality of category blocks indicating category information of each of the plurality of ML engines associated with the at least one framework application.

Each block of the category block chain may act as a root to the activity block chain.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A and 3B are flow diagrams illustrating a method for preventing data leakage to the ML engines available in the electronic device, according to an embodiment;

DETAILED DESCRIPTION

Figure 1:
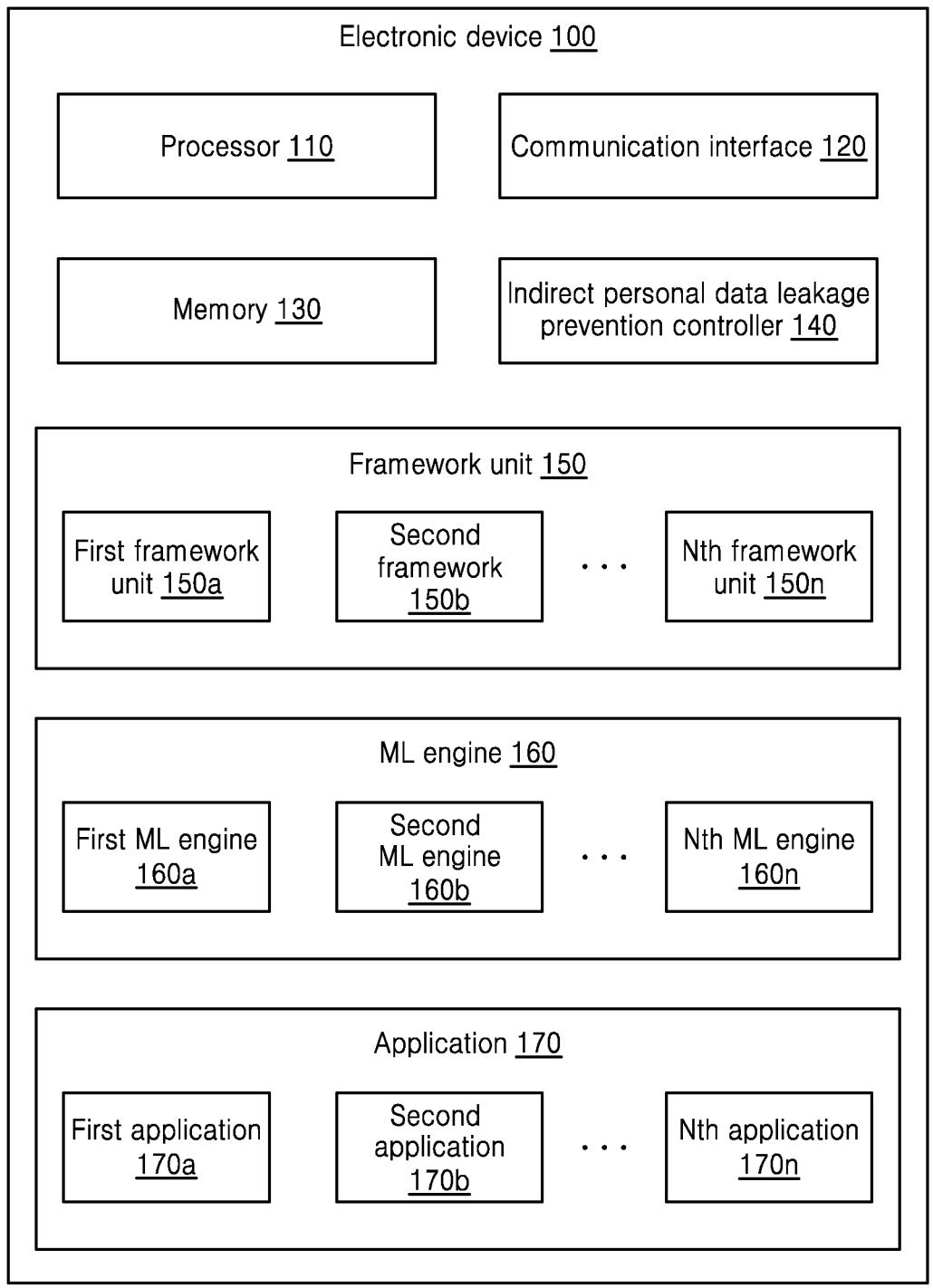
FIG. 1 shows various hardware components of an electronic device for preventing data leakage to ML engines available in the electronic device, according to an embodiment.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the embodiment. Likewise, the blocks of the embodiments may be physically combined into more complex blocks without departing from the scope of the embodiment.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Although the terms first, second, etc. may be used herein to describe various elements, these elements should not be limited by these terms. These terms are generally only used to distinguish one element from another.

One or more embodiments provide a method and an electronic device for preventing data leakage in an electronic device. The method may include: detecting a data request from a machine learning (ML) engine of a plurality of ML engines that requests at least one framework application of a plurality of framework applications to provide data; identifying the data that is generated by the at least one framework application in response to the data request from the ML engine; creating a plurality of data blocks based on the data generated by the at least one framework application, a category of the ML engine, and a tag associated with the ML engine and the at least one framework application; determining whether the plurality of data blocks are valid to share with the ML engine using an activity block chain associated with each of the plurality of framework applications; based on the plurality of data blocks being valid, sharing the plurality of data blocks with the ML engine, as a valid set of data blocks; and based on the plurality of data blocks not being valid, discarding the plurality of data blocks, as an invalid set of data blocks, not to be shared with the ML engine.

Unlike related art methods and systems, the method according to embodiments can be used to filter out personalized data for preventing indirect data leakage to the ML engines in an enhanced and cost effective manner, and therefore enhances the user privacy. In an embodiment, the ML engine installed on the electronic device can be categorized without any interaction with the already installed engine in the electronic device. This assists the electronic device to become an efficiency enhancer platform for all the ML engines.

In an embodiment, the electronic device focuses on a direct intervention by the ML engine in a user driven task to fetch data for learning. The electronic device can be used for creating block chains in a micro level of an operating system (OS) and saving a minimal encrypted data link of that data information into a database located inside the electronic device or user's any personal secondary storage space.

In an embodiment, the electronic device can be used for creating the block chains in a micro level of the OS system to create an interface in between the ML engine and the framework units of the OS to manage the data access of user's information's access to the ML engines. Tracking the calls of the ML engine to the underlying OS helps in prevention of the electronic device resources and efficient working of the ML engines by promoting secondary usage of the data.

The electronic device can be used to share more meaningful data to any ML engine installed by a validation mechanism of multiengine block chains and with more user driven data security by a data signature unit. The electronic device supports a user intervention in the block chain mechanism and parallel creates a secure in device engine to make user decision prediction on data sharing. In an embodiment, the electronic device does not depend if the engines involved are $3^{rd}$ party engines, on device engines or external learning engines as the method can be used to create a security layer over the devices in built units and not on the engines. The creation of block chain is made categorically intelligent to enhance secondary usage of already created data.

In order to optimize data storage, the data is stored in the database and a pointer is saved in a block of the micro block chain. The micro block chain avoids data redundancy and makes our system lightweight. The method according to an embodiment can be used to provide a block chain interface on each framework unit interacting directly with a ML engine to enhance data security and to allow a user to control over his/her data. This results in improving the ML engine efficiency. The method according to an embodiment can be used to intelligently share data extracted by one ML engine to another ML engine for learning, and therefore may prevent preventing extra resource usage to extract similar data multiple times in the electronic device.

Referring now to the drawings, and more particularly to FIGS. 1-9, 11A-11D, 13A-13E, 15 and 17, embodiments are described hereinafter.

FIG. 1 shows various hardware components of an electronic device 100 for preventing data leakage to ML engines 160a-160n available in the electronic device 100, according to an embodiment. The ML engines 160a-160 may be included in the electronic device 100, or may be stored in an external device (e.g., a server) and operated by the electronic device 100 via interactions with the external device. The electronic device 100 can be, for example, but not limited to a cellular phone, a smart phone, a Personal Digital Assistant PDA, a tablet computer, a laptop computer, an Internet of Things IoT, a flexible deice, a foldable device, an immersive system, and a virtual reality device.

The electronic device 100 includes a processor 110, a communication interface 120, a memory 130, an indirect personal data leakage prevention controller 140, a plurality of framework units 150, a plurality of ML engines 160 and an application 170, including a plurality of application 170a-170n. The processor 110 is coupled with the communication interface 120, the memory 130, the indirect personal data leakage prevention controller 140, the plurality of framework units 150, the plurality of ML engines 160 and the plurality of application 170. The application 170 can be, for example, but not limited to a chat application, a web browsing application, a messaging application, a social networking application, a game application, a dating application, a personal diet application, and a fitness application. The framework unit 150 can be, for example, but not limited to an activity manager that manages the lifecycle of applications and provides a common navigation back stack, a window manager, a package manager, a telephony manager, a content provider that enable applications to access data from other apps, such as an Contacts app, or to share their own data, a view system, a resource manager configured to provide access to non-code resources such as localized strings, graphics, and layout files, a location manager that tracks the location of the electronic device 100, a notification manager that enables applications to display custom alerts in a status bar, a surface manager, a media framework, a camera driver, and an audio driver. The framework unit 150 may be a set of core applications (or a set of system applications) for notification service, resource managements, location service, email, SMS messaging, calendars, internet browsing, contacts, and the like, and may access and control other applications installed on the electronic device 100. The framework unit 150 may be also referred to as a framework application.

The indirect personal data leakage prevention controller 140 may be incorporated into the processor 110, or may be implemented as another processor.

The indirect personal data leakage prevention controller 140 is configured to detect a request from an ML engine 160a-160n of the plurality of ML engines 160 to receive data from one or more framework unit 150a-150n of the plurality of framework units 150. After receiving the request from the ML engine 160a-160n, the indirect personal data leakage prevention controller 140 is configured to identify data generated by the one or more framework unit 150a-150n.

Further, the indirect personal data leakage prevention controller 140 is configured to create a plurality of data blocks based on the data generated by the one or more framework unit 150a-150n, a category of the ML engine 160a-160n, and a tag associated with the ML engine 160a-160n and the framework unit 150a-150n. The category can be, for example, but not limited to a social networking related category, a finance networking related category, a saving networking related category, and a messaging networking related category. The category of each of the ML engines 160a-160n may be determined based on similarities between types of data requested by the ML engines 160a-160n. For example, cosine similarities between vector values representing types of the data requested by the ML engines 160a-160n are computed to determine category of each of the ML engines 160a-160n.

Further, the indirect personal data leakage prevention controller 140 is configured to determine whether the plurality of data blocks are valid to share with the ML engine 160a-160n using an activity block chain associated with each framework unit 150a-150n.

Further, the indirect personal data leakage prevention controller 140 is configured to share the valid set of data blocks to the ML engine 160a-160n and discard an invalid set of data blocks to be shared with the ML engine 160a-160n. In an embodiment, the indirect personal data leakage prevention controller 140 is configured to learn one or more response from a user for allowing the one or more data sharing with the ML engine 160a-160n and create a ML model to predict the one or more response using a parameter for sharing the data among the plurality of the ML model. The parameter can be, for example, but not limited to a hash value, a process associated with the ML engine 160a-160n, a signature of the user, storage information and time stamp. Further, the indirect personal data leakage prevention controller 140 is configured to automatically create a user signature from the created ML model and generate a signed block including a private key based on the user signature. Further, the indirect personal data leakage prevention controller 140 is configured to determine whether the plurality of data blocks are valid to share with the ML engine 160a-160n using the activity block chain associated with each framework unit 150a-150n based on the generated signed block.

Further, the indirect personal data leakage prevention controller 140 is configured to send the valid set of data blocks to the plurality of framework units 160 at which a category block chain around each framework unit 150a-150n of the plurality of framework units 150. Further, the indirect personal data leakage prevention controller 140 is configured to update the activity block chain associated with each framework unit 150a-150n based on the category of the ML engine 160a-160n, the tag associated with the ML engine 160a-160n and the framework unit 150a-150n associated with the valid set of data blocks.

Further, the indirect personal data leakage prevention controller 140 is configured to create the activity block chain associated with each framework unit 150a-150n of the plurality of framework units 150. The indirect personal data leakage prevention controller 140 is configured to create the activity block chain by categorizing the ML engine 160a-160n from the plurality of ML engines 160 into one or more categories based on a communication pattern between each ML engine 160a-160n from the plurality of ML engines 160 and the framework unit 150a-150n, detecting a type of data exchange between the ML engine 160a-160n and the framework unit 150a-150n associated with the one or more categories, generating one or more tag for each ML engine 160a-160n belonging to the one or more categories based on the type of data exchange between the ML engine 160a-160n and the framework unit 150a-150n associated with the one or more categories, creating the activity block chain associated with each framework unit 150a-150n based on the one or more categories, the type of data exchange between the ML engine 160a-160n and the framework unit 150a-150n associated with the one or more categories, and actual data allowed between the ML engine 160a-160n and the framework unit 150a-150n associated with the one or more categories.

Further, the indirect personal data leakage prevention controller 140 is configured to detect the plurality of framework units 150 of the electronic device 100. Further, the indirect personal data leakage prevention controller 140 is configured to identify a communication pattern between each ML engine 160a-160n from the plurality of ML engines 160 available in the electronic device 100 and the framework unit 150a-150n of the plurality of framework units 150. Further, the indirect personal data leakage prevention controller 140 is configured to monitor the communication pattern between the ML engine 160a-160n and the framework unit 150a-150n. Further, the indirect personal data leakage prevention controller 140 is configured to categorize the ML engine from the plurality of ML engines 160 having the same communication pattern with the framework unit 150a-150n into the at least one category.

Further, the indirect personal data leakage prevention controller 140 is configured to create a category block chain based on the one or more categories. Further, the indirect personal data leakage prevention controller 140 is configured to create a micro block chain based on the type of data exchange between the ML engine 160a-160n and the framework unit 150a-150n associated with the one or more categories, and actual data allowed between the ML engine 160a-160n and the framework unit 150a-150n associated with the one or more categories. Further, the indirect personal data leakage prevention controller 140 is configured to create the activity block chain based on the category block chain and the micro block chain. The category block chain includes a plurality of category blocks indicating category information of each ML engine 160a-160n associated with the framework unit 150a-150n. The micro block chain includes a plurality of micro blocks indicating data generated by the framework unit 150a-150n on request from any ML engine 160a-160n belonging to the one or more categories. The data generated by the framework unit 150a-150n is stored in the micro blocks by encrypting the data and pointing it to the memory 130 associated with the micro block chain using a pointer. Each block of the category block chain acts as a root to the activity block chain.

The indirect personal data leakage prevention controller 140 is physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The indirect personal data leakage prevention controller 140 may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block.

At least one of the plurality of modules/blocks/circuits may be implemented through an AI model. A function associated with AI may be performed through the non-volatile memory, the volatile memory, and the processor 110.

The processor 110 is configured to execute instructions stored in the memory 130 and to perform various processes. The processor 110 may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor 140 may include multiple cores and is configured to execute the instructions stored in the memory 120.

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may include a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

The memory 130 also stores instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In some examples, the memory 130 can be configured to store larger amounts of information. In certain examples, a non-transitory storage medium may store data that can, over time, change (e.g., in Random Access Memory (RAM) or cache).

The processor 110 is configured to execute instructions stored in the memory 130 and to perform various processes. The processor 110 may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor 140 may include multiple cores and is configured to execute the instructions stored in the memory 120.

The communication interface 120 is configured for communicating internally between internal hardware components and with external devices via one or more networks. The communication interface 120 can be, for example, but not limited to a Bluetooth communication interface, a Wireless fidelity (Wi-Fi) module, and a Li-Fi module.

Although FIG. 1 shows various hardware components of the electronic device, 100 it is to be understood that other embodiments are not limited thereto. In other embodiments, the electronic device 100 may include less or more number of components. Further, the labels or names of the components are used only for illustrative purpose and does not limit the scope of the embodiment. One or more components can be combined together to perform the same or substantially the same function to prevent the data leakage to the ML engines 160a-160n available in the electronic device 100.

Figure 2:
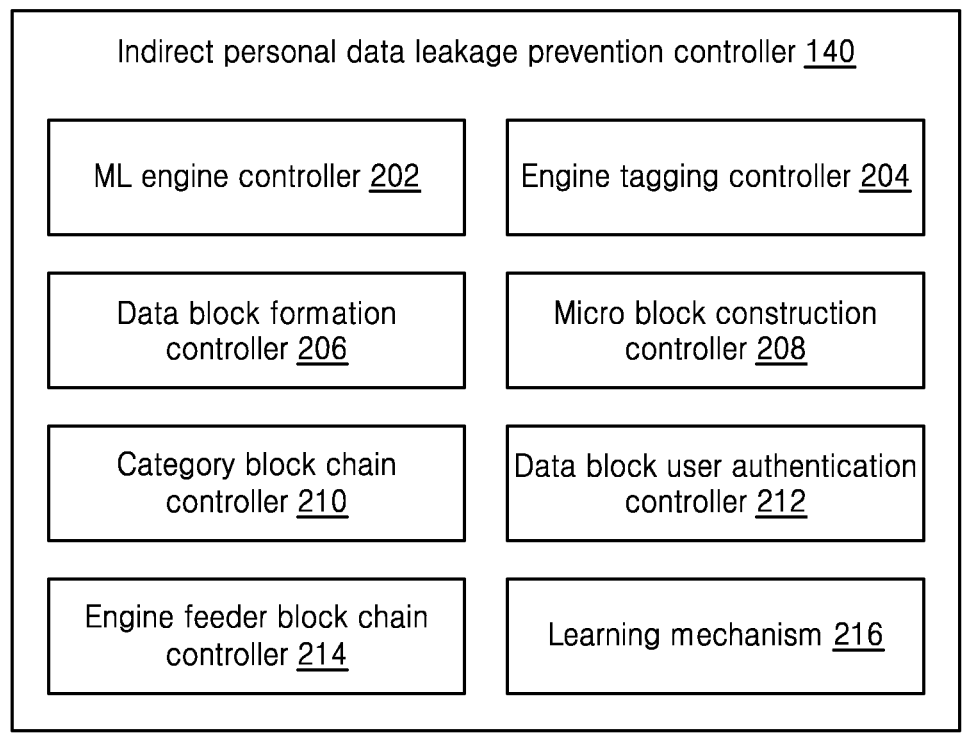
FIG. 2 shows various hardware components of an indirect personal data leakage prevention controller in the electronic device for preventing data leakage to the ML engines available in the electronic device, according to an embodiment.

FIG. 2 shows various hardware components of the indirect personal data leakage prevention controller 140 in the electronic device 100 for preventing data leakage to the ML engines 160a-160n available in the electronic device 100, according to an embodiment. In an embodiment, the indirect personal data leakage prevention controller 140 includes a ML engine controller 202, an engine tagging controller 204, a data block formation controller 206, a micro block construction controller 208, a category block chain controller 210, a data block user authentication controller 212, an engine feeder block chain controller 214 and learning mechanism 216.

The ML engine controller 202 is physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The ML engine controller 210 categorizes each ML engine 160a-160n on the basis of interaction with the one or more framework unit 150a-150n. Specifically, the ML engine controller 202 categorizes each engine on the basis of which all units of underlying architecture are being observed by the engines to fetch data for learning.

The engine tagging controller 204 tags each ML engine 160a-160n with the content type accessible. Specifically, the engine tagging controller 204 tags the ML engine 100 with what data required from the framework unit 150. The engine tagging controller 204 is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

The engine feeder block chain controller 214 along with its side chains acts as an interface for each one or more framework unit 150a-150n so that any ML engine 160a-160n that observes the one or more framework unit 150a-150n does not fetch data directly from the data without the block chain validation mechanism. The engine feeder block chain controller 214 is physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The engine feeder block chain controller 214 is coupled with the data block formation controller 206, the micro block construction controller 208, a category block chain controller 210, and the data block user authentication controller 210.

The micro block construction controller 208 creates a (data) block from the data being observed by the ML engine 160a-160n, and keeps the block light weight by keeping only the encrypted DB pointer to the actual data kept in the memory 130. The micro block construction controller 208 is physically implemented by analog or digital circuits such as logic gates, integrated circuits, microprocessors, microcontrollers, memory circuits, passive electronic components, active electronic components, optical components, hardwired circuits, or the like, and may optionally be driven by firmware The category block chain controller 210 controls an engine category information for a system architecture unit.

The category block chain controller 210 acts as a root node for the side chain which contains data information for engines related to the category. The category block chain controller 210 is physically implemented by analog or digital circuits such as logic gates, integrated circuits, microprocessors, microcontrollers, memory circuits, passive electronic components, active electronic components, optical components, hardwired circuits, or the like, and may optionally be driven by firmware The micro block construction controller 208 controls and creates the micro block, where the micro block is created when the data is generated by the framework unit 150a-150n on request from any ML engine 160 of the category present in the root of this side chain. In the micro block, the data present in it, is encrypted to be a pointer of a database row where the actual data is saved. Thus, the size of the block in the lower system layer remains very low.

The category block chain controller 210 controls the category block containing the engine category information for system architecture unit. The category block acts as a root node for the side chain which contains data information for engines related to the category.

The learning mechanism 216 takes input from a user's response in the signatory unit and learns to auto predict user response in future by identifying key parameters of a user's decision. In the data block user authentication controller, a validation mechanism is used. The validation mechanism uses the tags created for each engine to validate if the signature data being generated is useful for other engines of similar category or not.

Further, the learning mechanism 216 collects all the information and the activities, requires permission from the electronic device 100, and feeds into a reinforced observer model. The reinforced observer model clusters the processed data using the ML techniques. Whenever a new data access category is detected, the learning monitors user action and saves it as input for further processing.

Although FIG. 2 shows various hardware components of the indirect personal data leakage prevention controller 140, it is to be understood that other embodiments are not limited thereto. In other embodiments, the indirect personal data leakage prevention controller 140 may include less or more number of components. Further, the labels or names of the components are used only for illustrative purposes, and do not limit the scope of the embodiment. One or more components can be combined together to perform the same or substantially the same function to prevent the data leakage to the ML engines 160a-160n available in the electronic device 100.

Figure 3B:
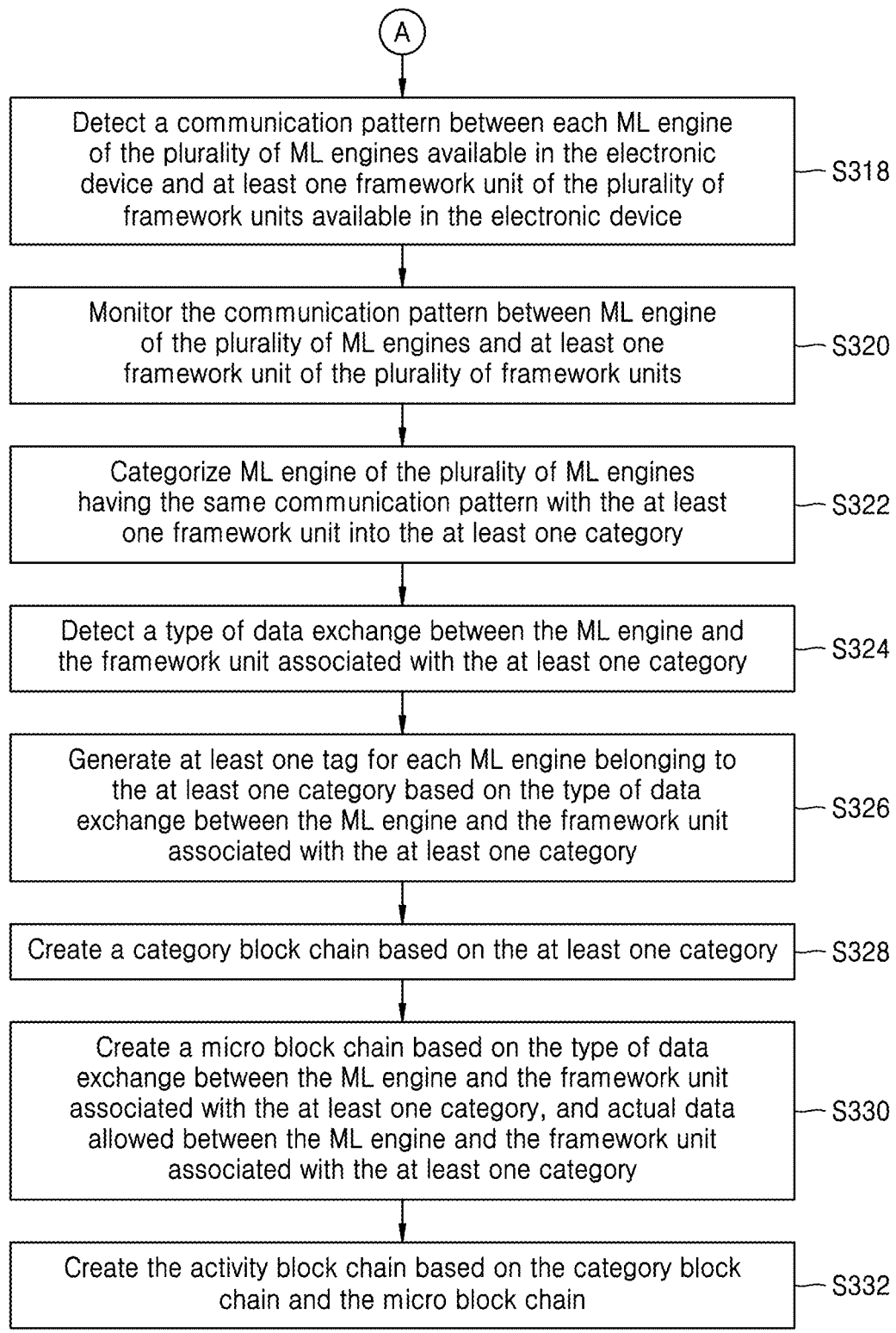

FIGS. 3A and 3B are flow diagrams 300 illustrating a method for preventing data leakage to the ML engines 160 available in the electronic device 100, according to an embodiment. The operations S302-S332 are performed by the indirect personal data leakage prevention controller 140.

At S302, the method includes detecting the request from the ML engine 160a-160n from the plurality of ML engines 160 to receive data from the framework unit 150a-150n from the plurality of framework units 150. At S304, the method includes detecting the data generated by the framework unit 150a-150n in response to receiving the request from the ML engine 160a-160n. At S306, the method includes creating the plurality of data blocks based on the data generated by the framework unit 150a-150n, the category of the ML engine 160a-160n, and a tag associated with the ML engine 160a-160n and the framework unit 150a-150n.

At S308, the method includes determining whether the plurality of data blocks are valid to share with the ML engine 160a-160n using the activity block chain associated with each framework unit 150a-150n of the plurality of framework units 150. At S310, the method includes sharing the valid set of data blocks to the ML engine 160a-160n and discarding the invalid set of data blocks to be shared with the ML engine 160a-160n.

At S312, the method includes sending the valid set of data blocks to the plurality of framework units 150a-150n. At S314, the method includes updating the activity block chain associated with each framework unit 150a-150n of the plurality of framework units 150 based on the category of the ML engine 160a-160n, the tag associated with the ML engine 160a-160n and the framework unit 150a-150n associated with the valid set of data blocks.

At S316, the method includes detecting the plurality of framework units 150 of the electronic device 100. At S318, the method includes detecting the communication pattern between each ML engine 160a-160n from the plurality of ML engines 160 and the framework unit 150a-150n. At S320, the method includes monitoring the communication pattern between the ML engine 160a-160n and the framework unit 150a-150n.

At S322, the method includes categorizing the ML engine 160a-160n from the plurality of ML engines 160 having the same communication pattern with the framework unit 150a-150n into the one or more categories. At S324, the method includes detecting the type of data exchange between the ML engine 160a-160n and the framework unit 150a-150n associated with the one or more categories. At S326, the method includes generating the one or more tag for each ML engine 160a-160n belonging to the one or more categories based on the type of data exchange between the ML engine 160a-160n and the framework unit 150a-150n associated with the one or more categories.

At S328, the method includes creating the category block chain based on the one or more categories. At S330, the method includes creating the micro block chain based on the type of data exchange between the ML engine 160a-160n and the framework unit 150a-150n associated with the one or more categories, and actual data allowed between the ML engine 160a-160n and the framework unit 150a-150n associated with the one or more categories. At S332, the method includes creating the activity block chain based on the category block chain and the micro block chain.

The various actions, acts, blocks, steps, operations, or the like in the flow diagram 300 may be performed in the order presented, in a different order or simultaneously. Further, in some embodiments, some of the actions, acts, blocks, steps, operations, or the like may be omitted, added, modified, skipped, or the like without departing from the scope of the embodiment.

Figure 4:
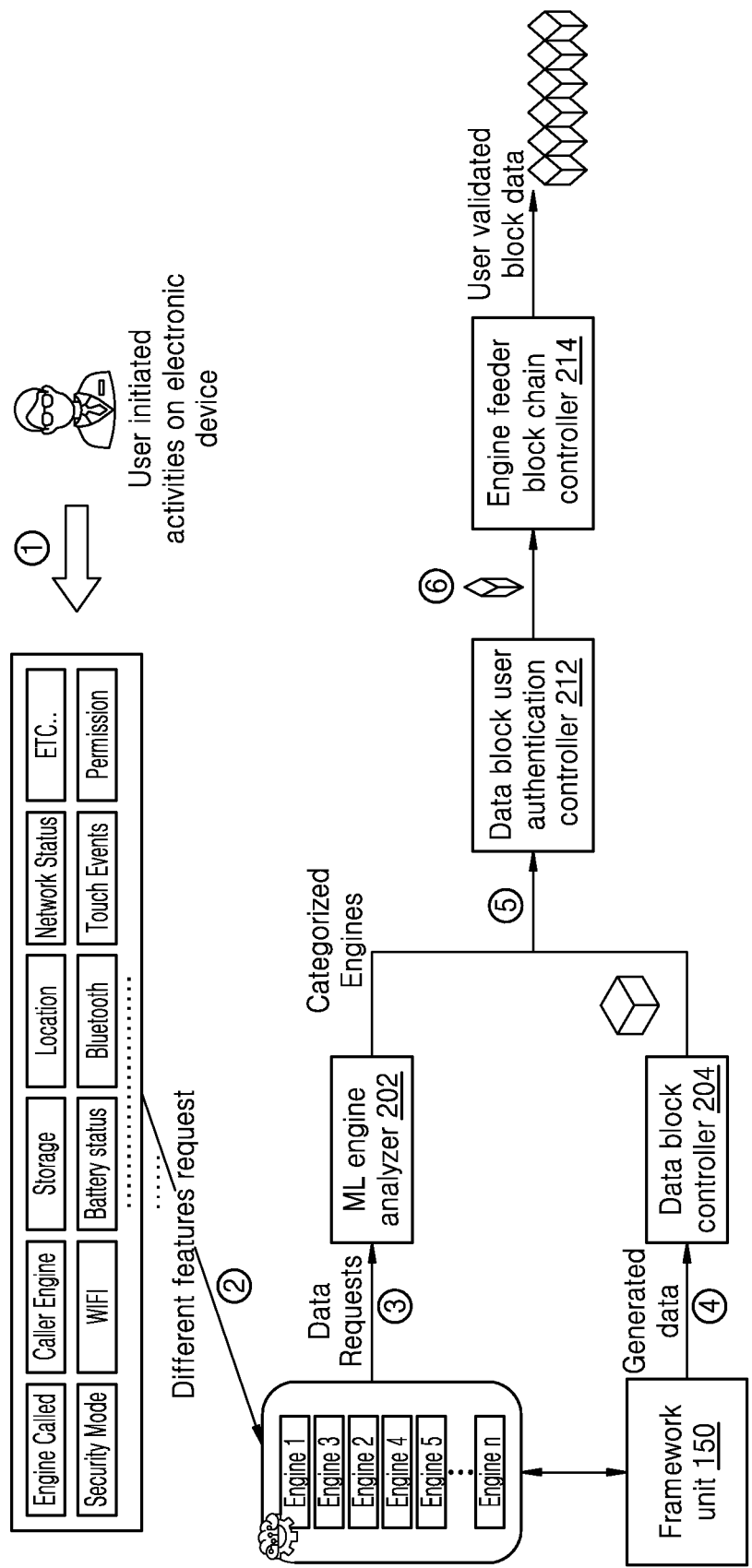
FIG. 4 is a general overview of overall unit input and output operations performed by the electronic device for preventing data leakage to the ML engines available in the electronic device, according to an embodiment.

FIG. 4 is a general overview of overall unit input and output operations performed by the electronic device 100 for preventing data leakage to the ML engines 160 available in the electronic device 100, according to an embodiment. Referring to FIG. 4, at operation 1, the user of the electronic device 100 initiates activities on the electronic device 100. At operation 2, based on the activities, the frame work unit 150 sends a features request to the ML engine 160. At operation 3, based on the features request, the ML engine 100 sends the data request to the ML engine controller 202. At operation 4, the frame work unit 150 sends the generated data to the data block controller 204. At operation 5, the data block user authentication controller 212 authenticates the data block using the user signature. At operation 6, the data block user authentication controller 212 sends the authenticated data block to the engine feeder block chain controller 214. The data block user authentication controller 212 authenticates whether the block is valid as per user usage. At operation 7, the user validated block data is stored using the engine feeder block chain controller 214. The block data is added to the block chain and the block data is shared with all corresponding engines 160. Further, the engine feeder block chain controller 214 determines the data applicable for secondary usage by any other installed ML engine in the electronic device 100.

Figure 5:
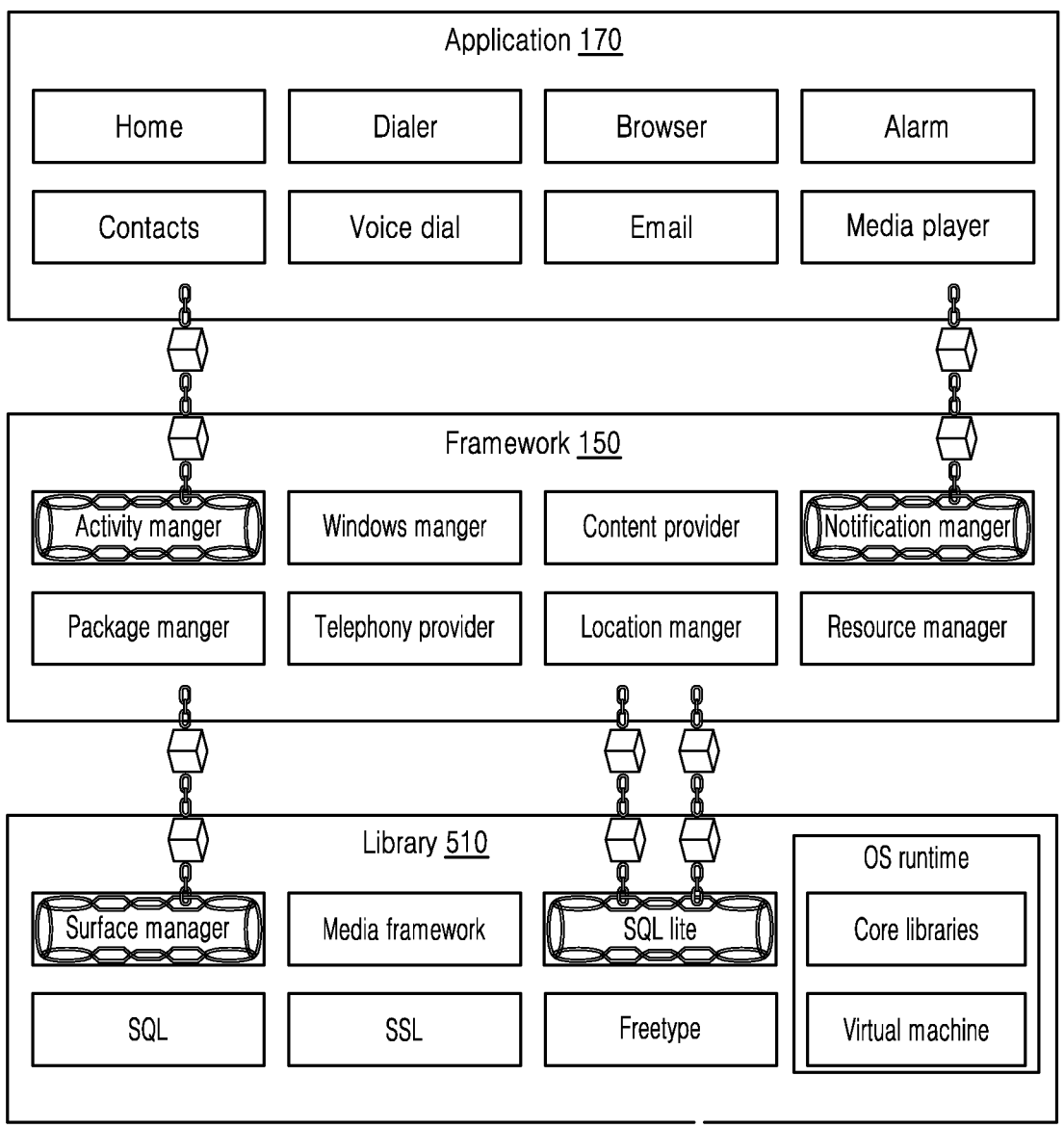
FIG. 5 is a pictorial depiction of an engine feeder block chain in a system architecture of the electronic device, according to an embodiment.
Figure 5:
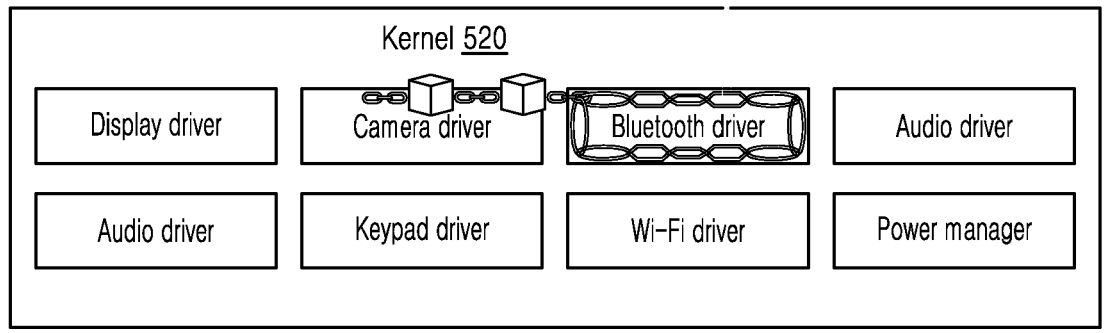
Figure 6:
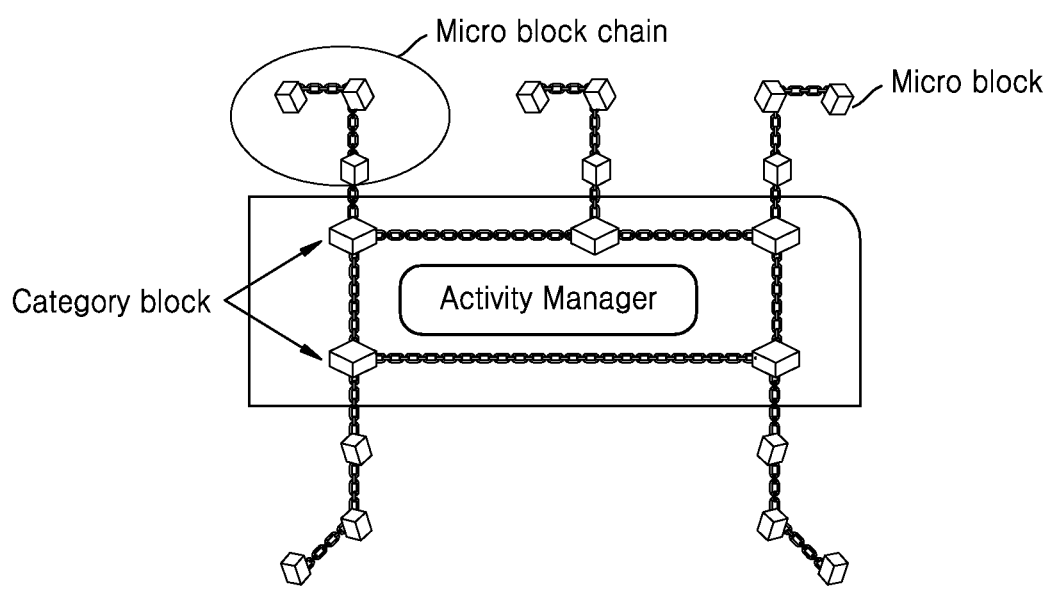
FIG. 6 is an internal elements of the engine feeder block chain of the electronic device, according to an embodiment.

FIG. 5 is a pictorial depiction of an engine feeder block chain controller 214 in a system architecture of the electronic device 100, according to an embodiment. Referring to FIG. 5, the engine feeder block chain controller 214 is a signature micro block chain which acts as a root (category block) to the side chain for data belonging to the engine of similar category. Thus it acts as an interface for every observer that interacts with various units of framework/Android Architecture for fetching data for various types of ML engines 160. In an example, the block chain with side chains applied on the notification manager FIG. 6 illustrate internal elements of the engine feeder block chain controller 214 of the electronic device 100, according to an embodiment. The engine feeder block chain controller 214 includes the category block, the micro block, the micro block chain and the category block chain. The category block contains the engine category information for a system architecture unit. The category block acts as a root node for the side chain which contains data information for engines related to this category. The micro block is created when the data is generated by the unit on request from any ML engine 160 of the category present in the root of this side chain. It is Called Micro Block as the Data present in it, is encrypted to be a pointer of the database row where the actual data is saved. Thus, the size of the block in a lower system layer remains very low. The micro block chain contains the micro blocks of data approved by the user or an automated engine, and validated by other nodes/engine tags from the same category as its root node. The category block chain contains blocks having category of engine as data. A chain surrounding system unit being observed by the ML engines 160.

Figure 7:
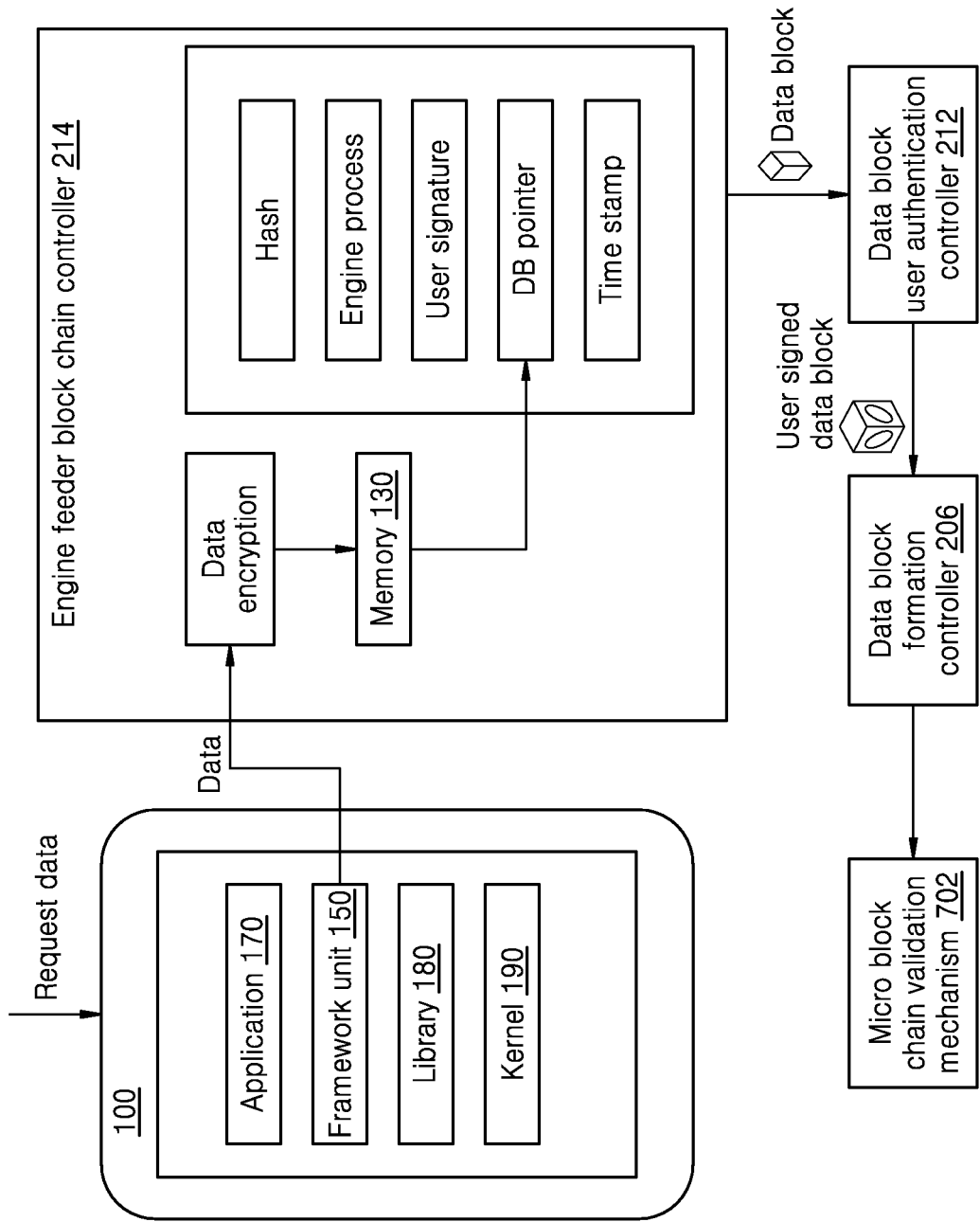
FIG. 7 is example illustration in which a block construction controller operation is depicted, according to an embodiment.

FIG. 7 illustrates a block construction controller operation according to an embodiment. The block construction is already explained in conjunction with FIG. 1, FIG. 2, and FIGS. 3A and 3B. Further, the data from the framework unit 150 is encrypted in the format as required by the block to be added into the block chain. In the micro block construction controller 208, the data set is encrypted using the hash, the engine process, user signature, the DB pointer and the time stamp. The hash is an encrypted pointer of a previous and next block memory of the block chain. The engine process is a process name of the ML engine 160 which has requested the data from the Framework unit 150. The user signature is filled which gets updated once the data is sent to the signature addition controller for user authentication. The DB pointer in which the data to prevent the large storage usage in the micro level is maintained in the secured database and the pointer to the DB field is saved in the block. The time stamp is time for the demand of data. Further, the micro block chain validation mechanism 702 is explained in FIG. 8.

Figure 8:
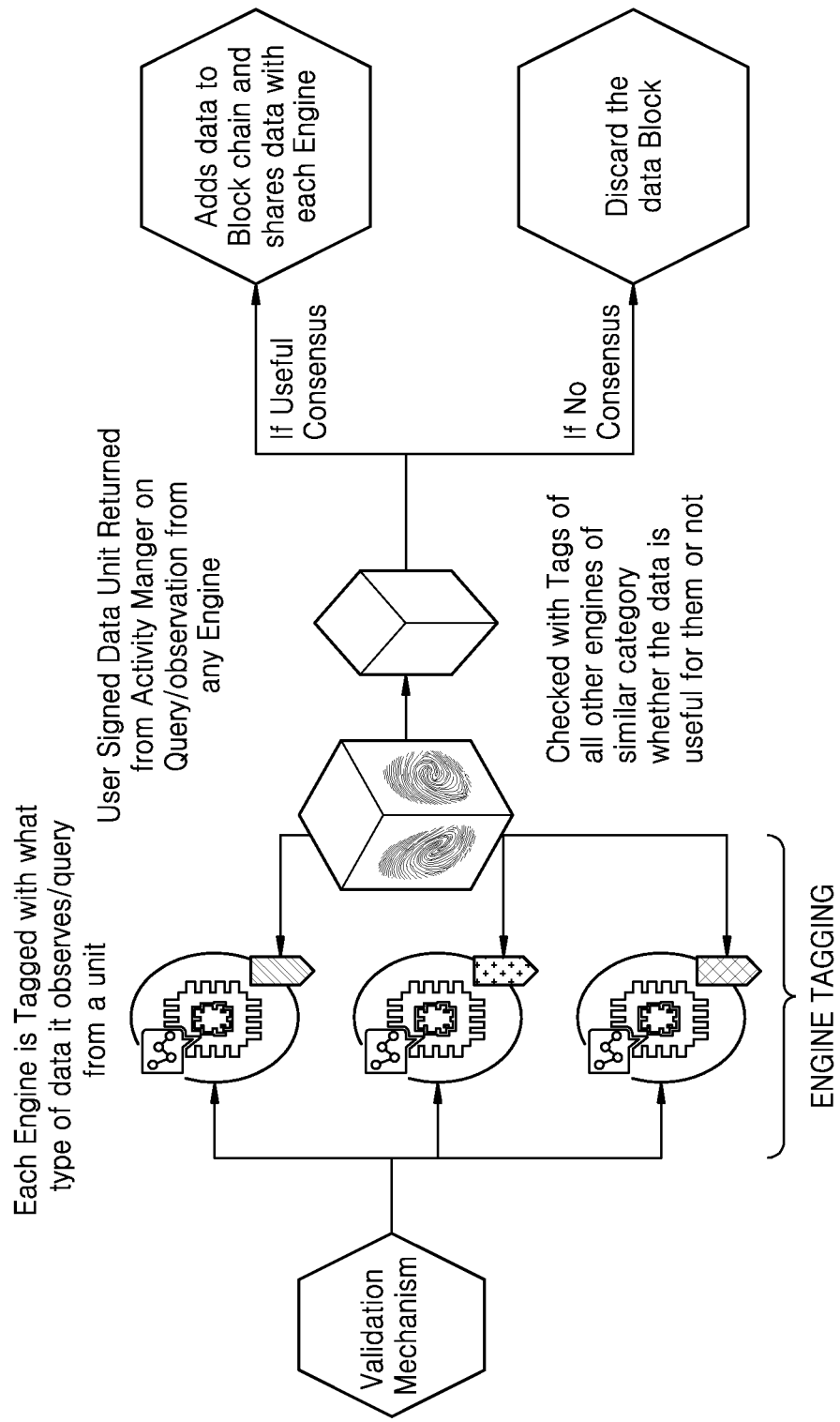
FIG. 8 is example illustration in which a micro block chain validation mechanism of the electronic device is explained, according to an embodiment.

FIG. 8 illustrates the micro block chain validation mechanism 702 of the electronic device 100, according to an embodiment. The micro block chain validation mechanism 702 checks with the tags of all other engines of similar category whether the data is useful for them of not. If there is a useful consensus, the micro block chain validation mechanism 702 adds the data to the block chain and shares data with each engine. If not the useful consensus, the micro block chain validation mechanism 702 discards the data block.

Figure 9:
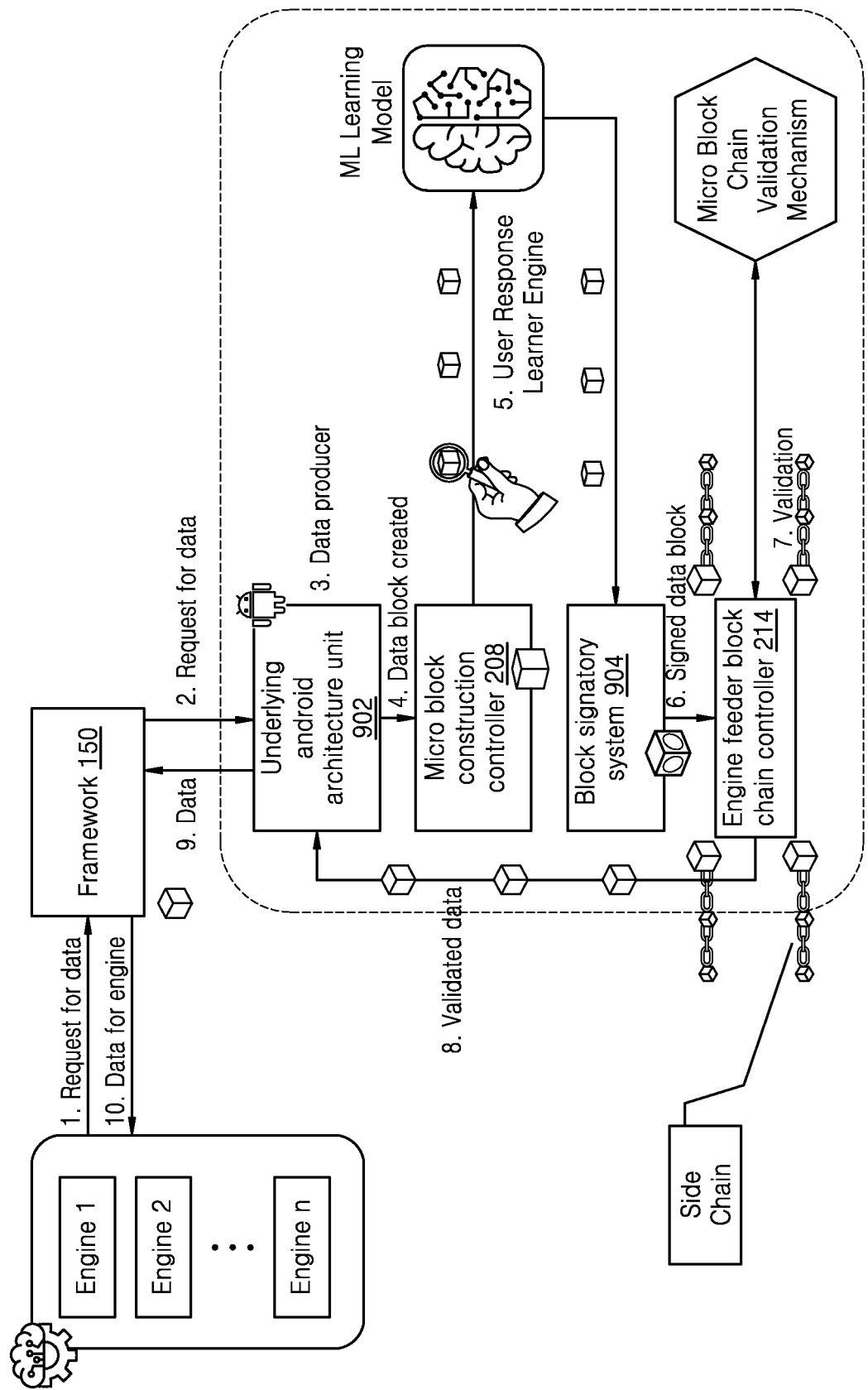
FIG. 9 shows general overview of various hardware components of the electronic device for preventing data leakage to ML engines available in the electronic device, according to an embodiment.

FIG. 9 shows general overview of various hardware components of the electronic device 100 for preventing data leakage to ML engines 160, according to an embodiment.

At operation 1, the ML engine 160 requests for data to the framework unit 150. At operation 2, the framework unit 150 requests for the data to the underlying android architecture unit. At operation 3, the underlying android architecture unit 902 produces the data block. At operation 4, the underlying android architecture unit 902 sends the data block to the micro block construction controller 208. At operation 5, the micro block construction controller 208 sends the user response to the ML learning model. The ML learning model sends the data block to the block signatory system 904. At operation 6, the block signatory system 904 sends the signed data block to the engine feeder block chain. At operation 7, the engine feeder block chain 214 validates the signed data block using a micro block chain validation mechanism.

Figure 10:
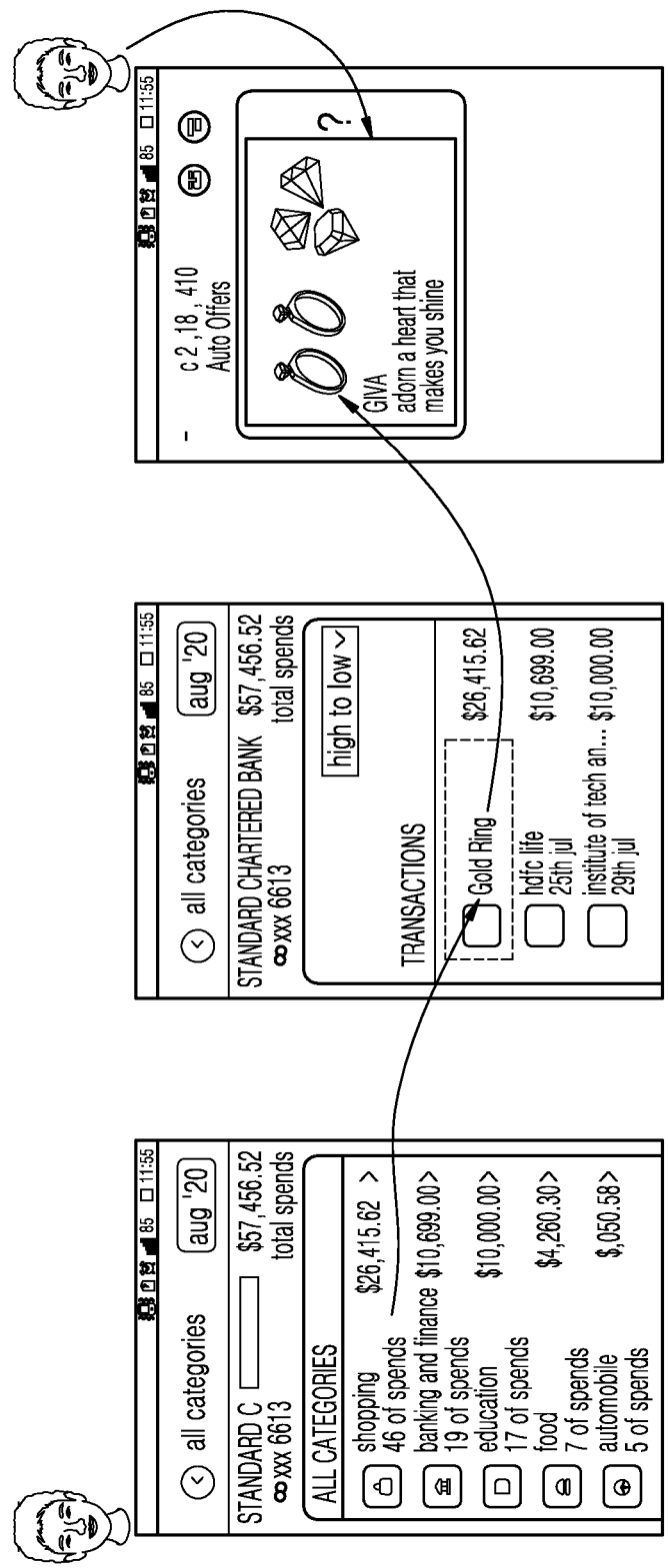
FIG. 10 is example illustration in which an ML engine fetched a personal expense and accordingly shows an offer to an user, according to the related art.

FIG. 10 is an example illustration in which an ML engine fetched a personal expense and accordingly shows an offer to a user of an electronic device in the related art. As shown in FIG. 10, the cred application engine reads all the transactions of the user of the electronic device 100 and based on user transactions behavior will provide the offers related to user's expense. Hence, the user compromised with the security of their personal data as an ML engine uses the user's data without the knowledge of user.

FIGS. 11A-11D are example illustrations in which the ML engine fetched a personal expense and accordingly shows an offer to the user of the electronic device 100, according to an embodiment.

Figure 11A:
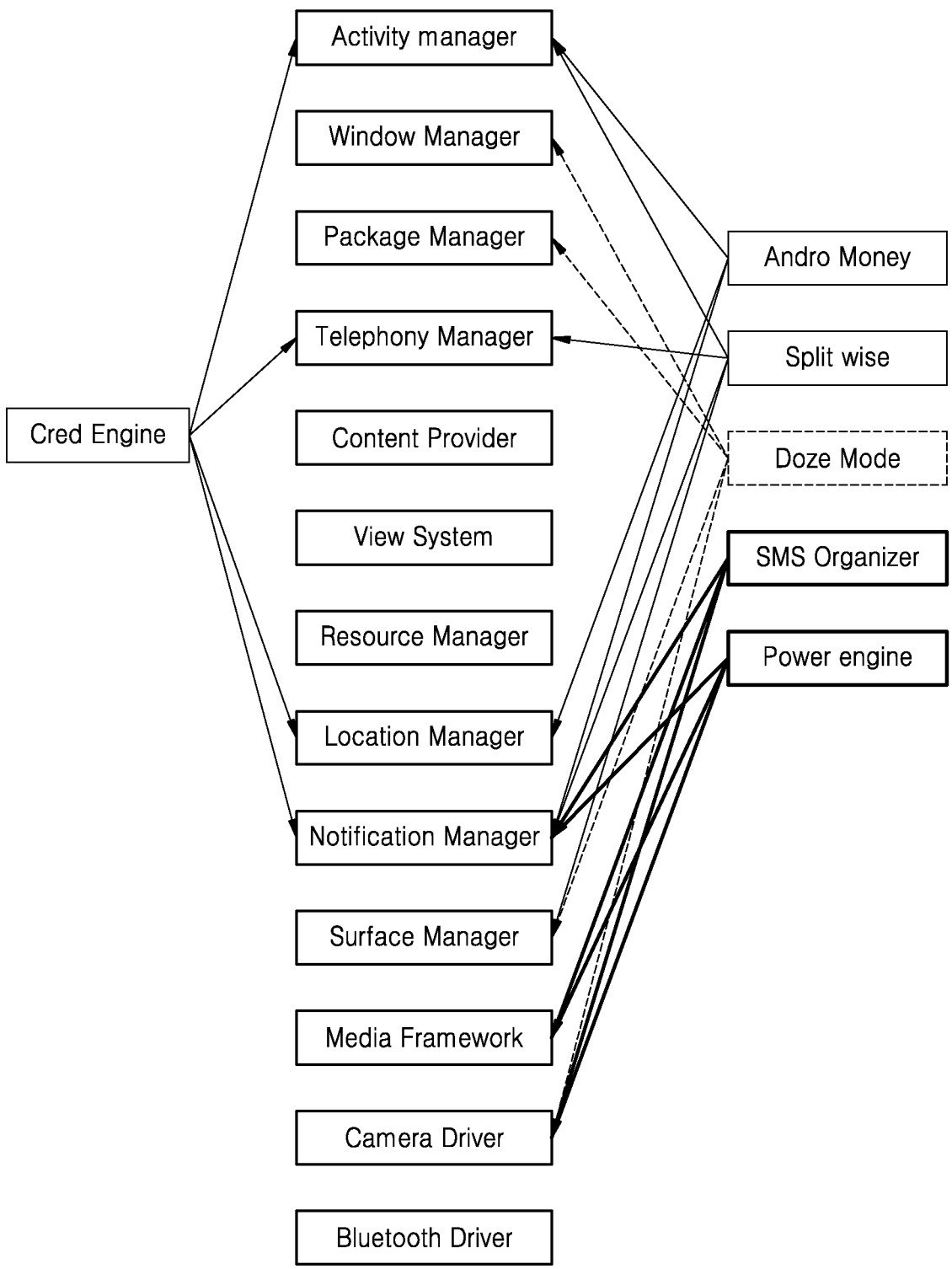
FIGS. 11A-11D are example illustration in which an ML engine fetched a personal expense and accordingly shows an offer to an user, according to an embodiment.
Figure 11B:
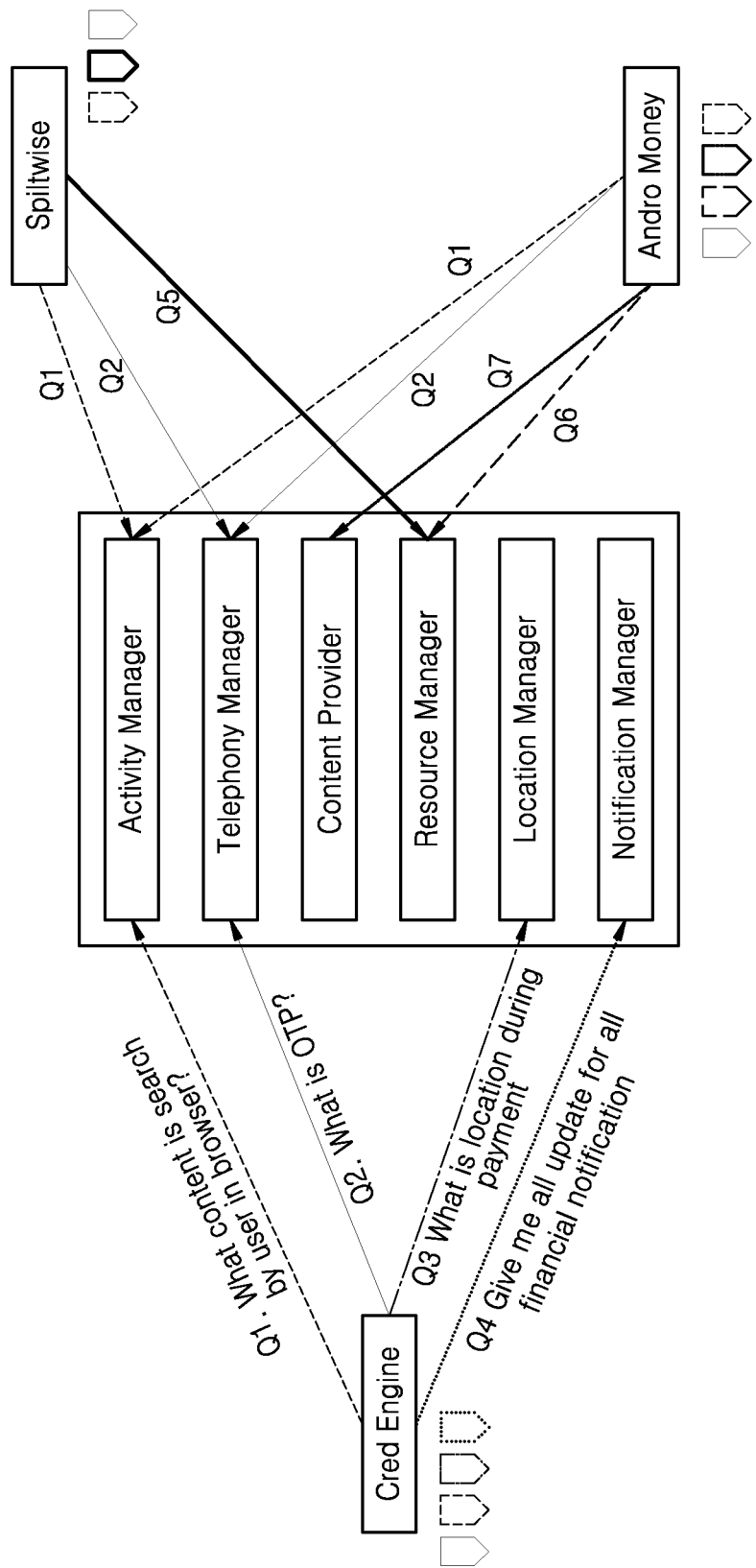

As shown in FIG. 11A, the cred Engine®, Money Engine® and Splitwise Engine® observe most similar system units. Thus, the cred Engine®, Andro Money Engine® and Splitwise Engine® are categorized to be in same category by the electronic device 100. As shown in FIG. 11A, each Engine is tagged with "What data is required from a Particular unit". Hence, the cred Engine®, Splitwise Engine® and Andro Money Engine® are tagged with each unit accordingly.

Figure 11C:
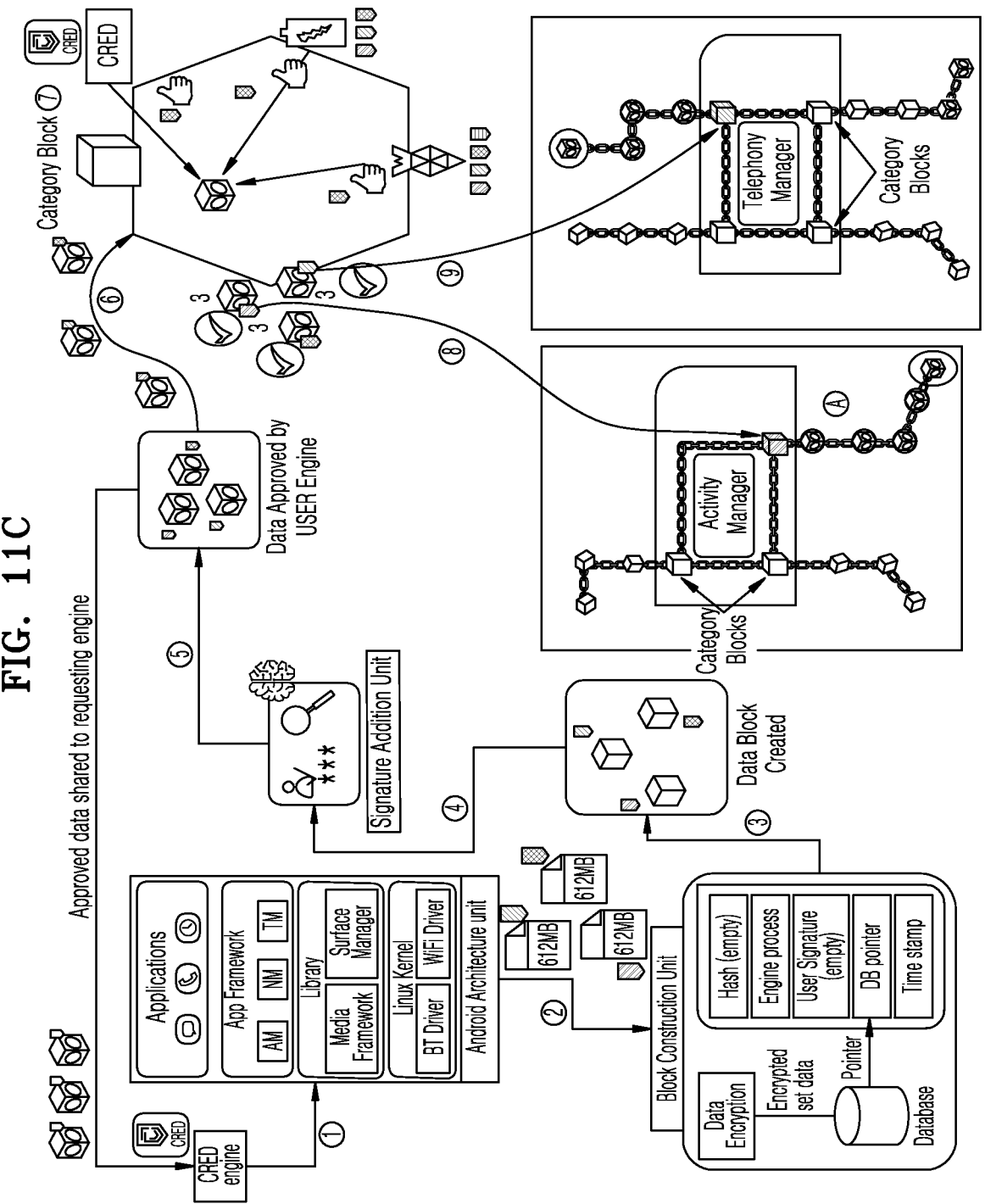

As shown in FIG. 11C, at operation 1, the cred engine Requests data from the activity manager, the notification manager, the telephony manager, and the layout manager. At operation 2, the activity manager, the notification manager, the telephony manager, and the layout manager generate the data as requested by the cred engine and send the data to the data block controller 232. At operation 3, the single data block is created using data from the activity manager, the notification manager, the telephony manager, and the layout manager. At operation 4, each data block is sent to the data block user authentication controller 238 for user approval on data sharing. At operation 5, three blocks are approved by the user and one block is rejected by the user of the electronic device 100. The approved blocks are shared to the cred engine. At operation 6, three signature blocks are sent to the data block user authentication controller 238. At operation 7, other engines in a similar category verifies this data using their tag if the data is useful for them or not. At operation 8, based on the verification, two data blocks are validated and one data block is rejected. At operation 9, the blocks are added to their respective side chains of their category engine and their unit engine feeder chain.

Figure 11D:
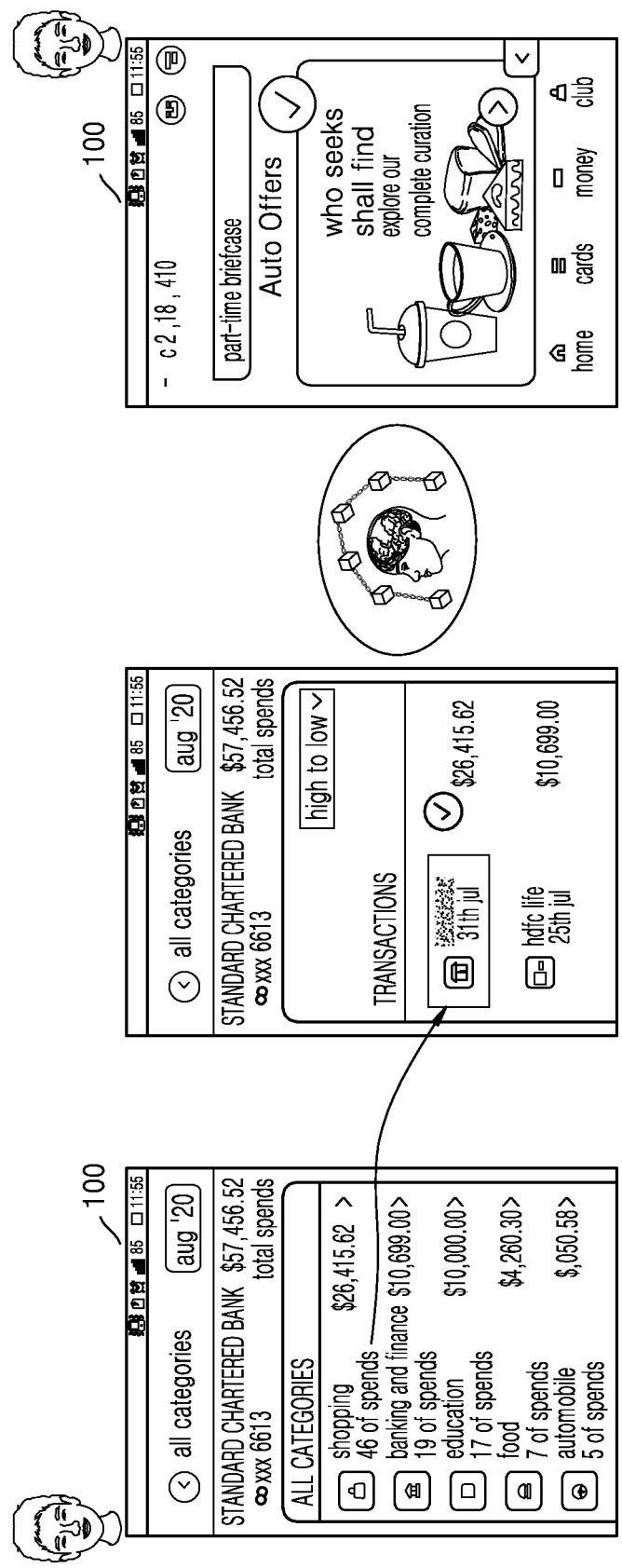

As shown in FIG. 11D, the ML engine fetched non-personal expenses and shows an offer to the user based on the fetched non-personal expenses. The method according to an embodiment can be used to prevent unwanted access of user's data to the ML engine 160 and helps users in an unwanted situation.

Figure 12:
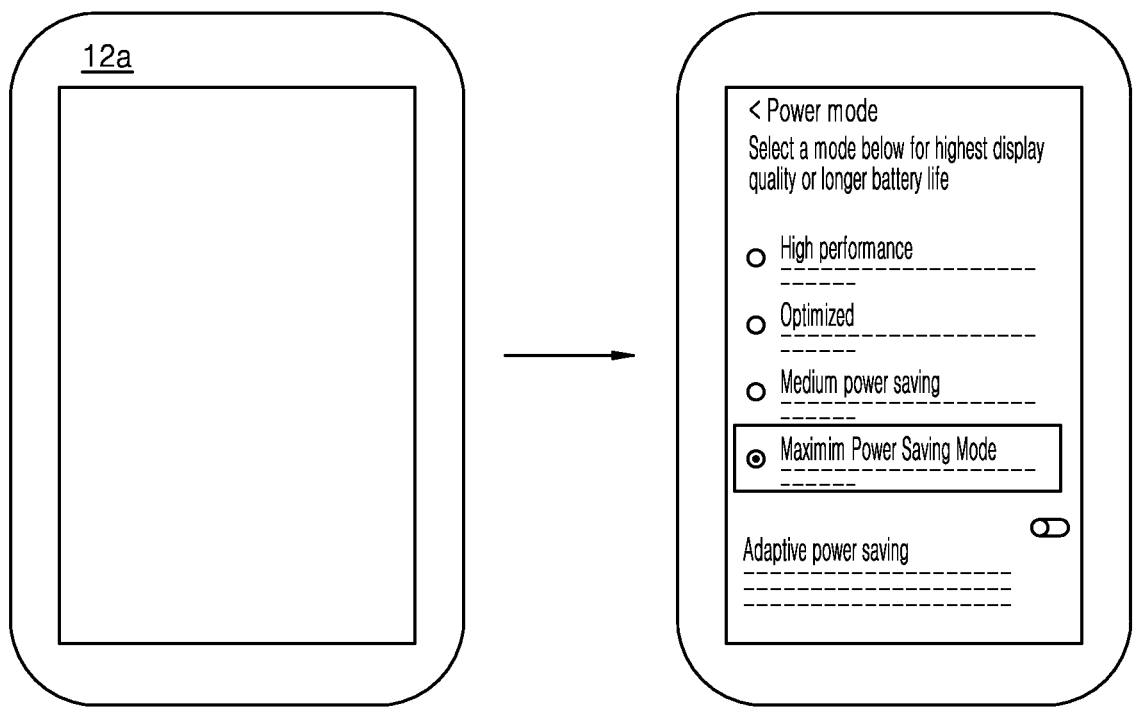
FIG. 12 is example illustration in which a first electronic device transfers the data to a second electronic device, according to the related art.
Figure 12:
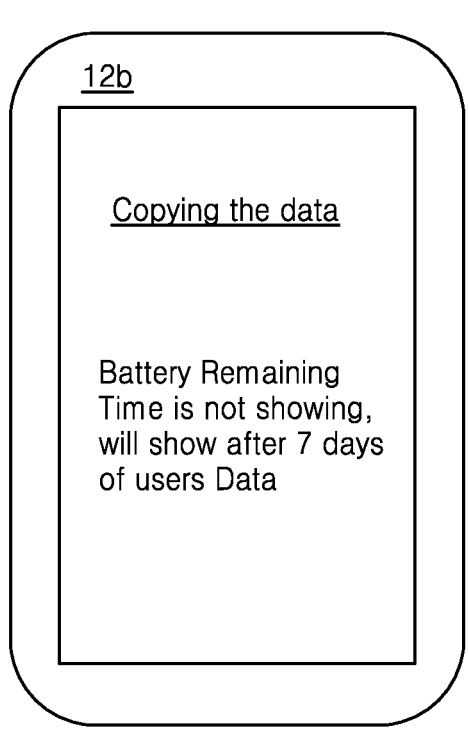

FIG. 12 is an example illustration in which a first electronic device 12a transfers data to a second electronic device 12b in the related art. As shown in FIG. 12, the first electronic device 12a transfers the data to the second electronic device 12b and in the second electronic device 12b, the user of the second electronic device 12b opens a maximum power saving mode (MPSM) and will show remaining battery life of the second electronic device 12b. The remaining battery life will be shown to the user after using the second electronic device 12b for a few days.

FIGS. 13A-13E are example illustrations in which the first electronic device 100a transfers the data to the second electronic device 100b, according to an embodiment.

Figure 13A:
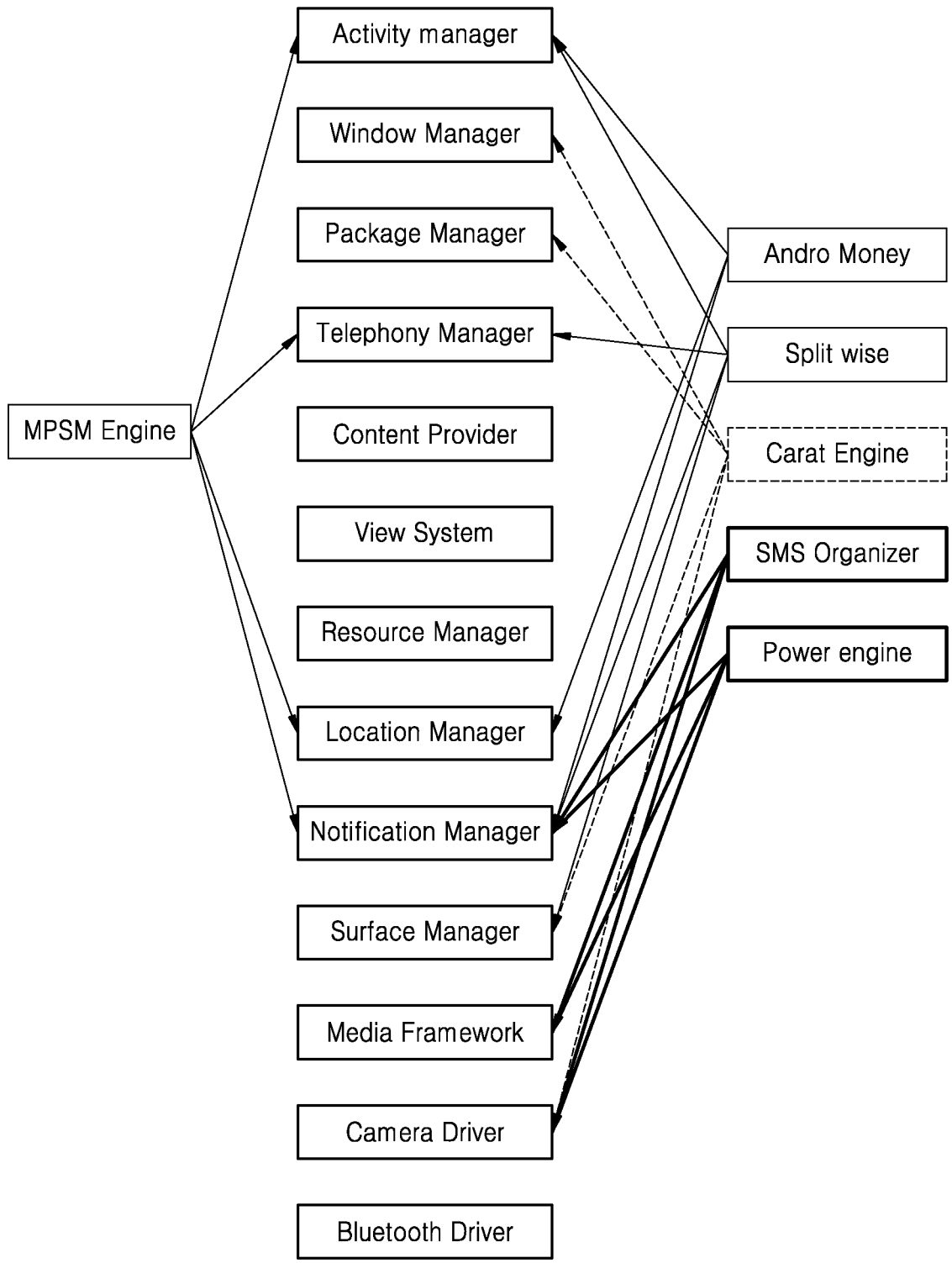
FIGS. 13A-13E are example illustration in which the first electronic device transfers the data to the second electronic device, according to an embodiment.
Figure 13B:
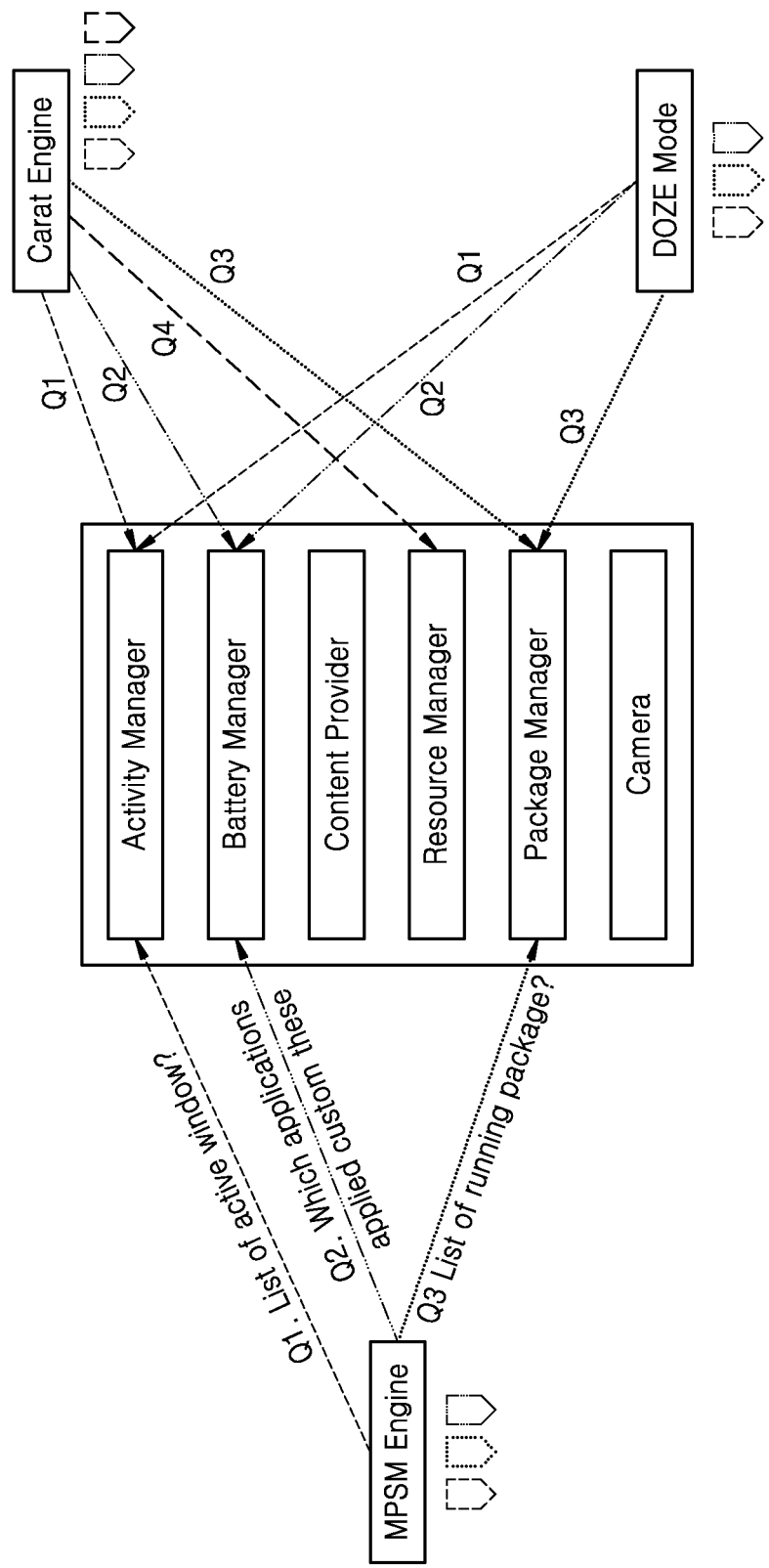

As shown in FIG. 13A, MPSM Engine®, Carat Engine® and Doze Mode® observe most similar system units. Hence, they are categorized to be in the same category. As shown in FIG. 13B, each engine is tagged with "What data is Required from a Particular unit". Thus MPSM Engine®, Carat Engine® and DOZE Mode® are tagged with each unit accordingly.

Figure 13C:
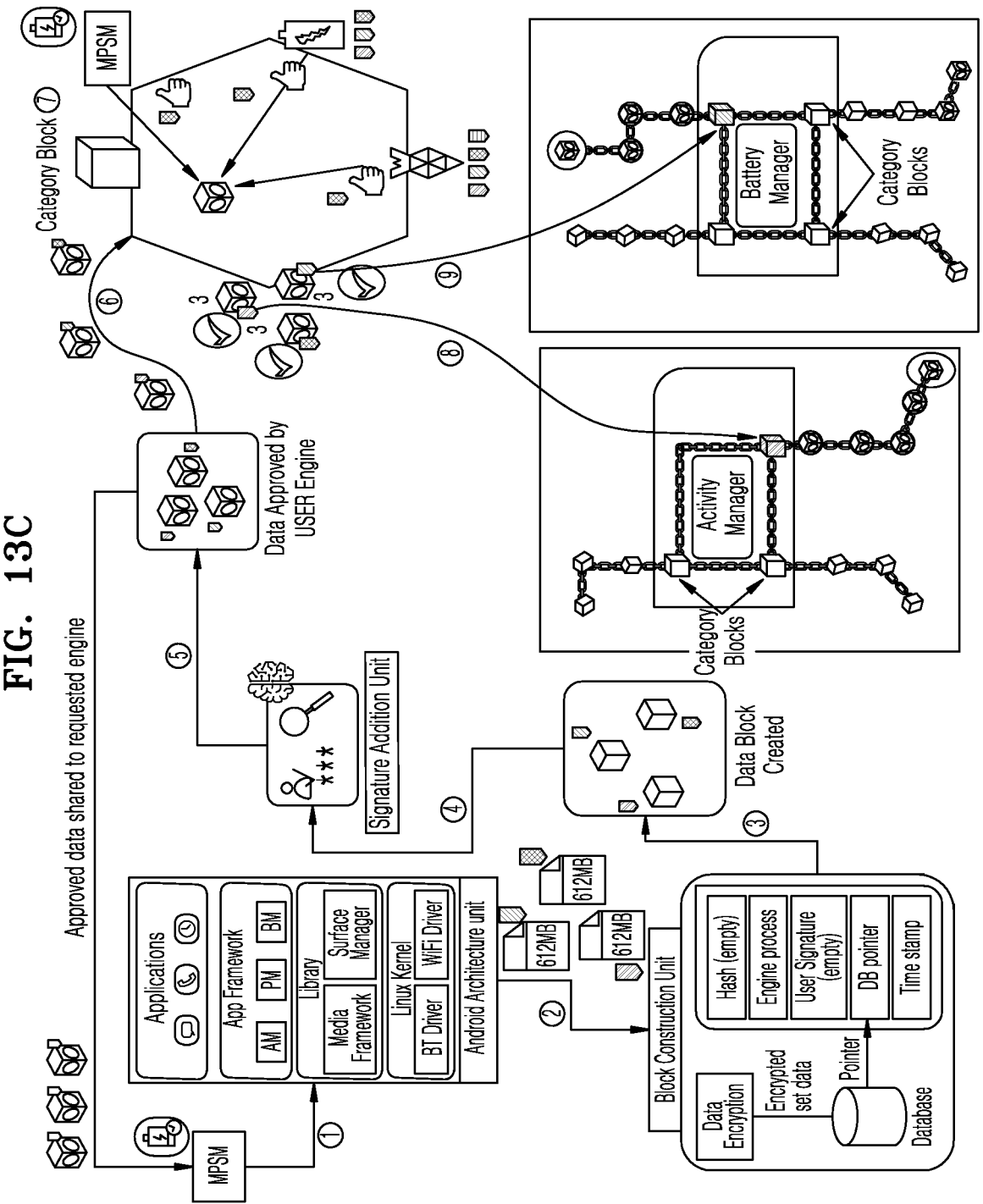
Figure 13D:
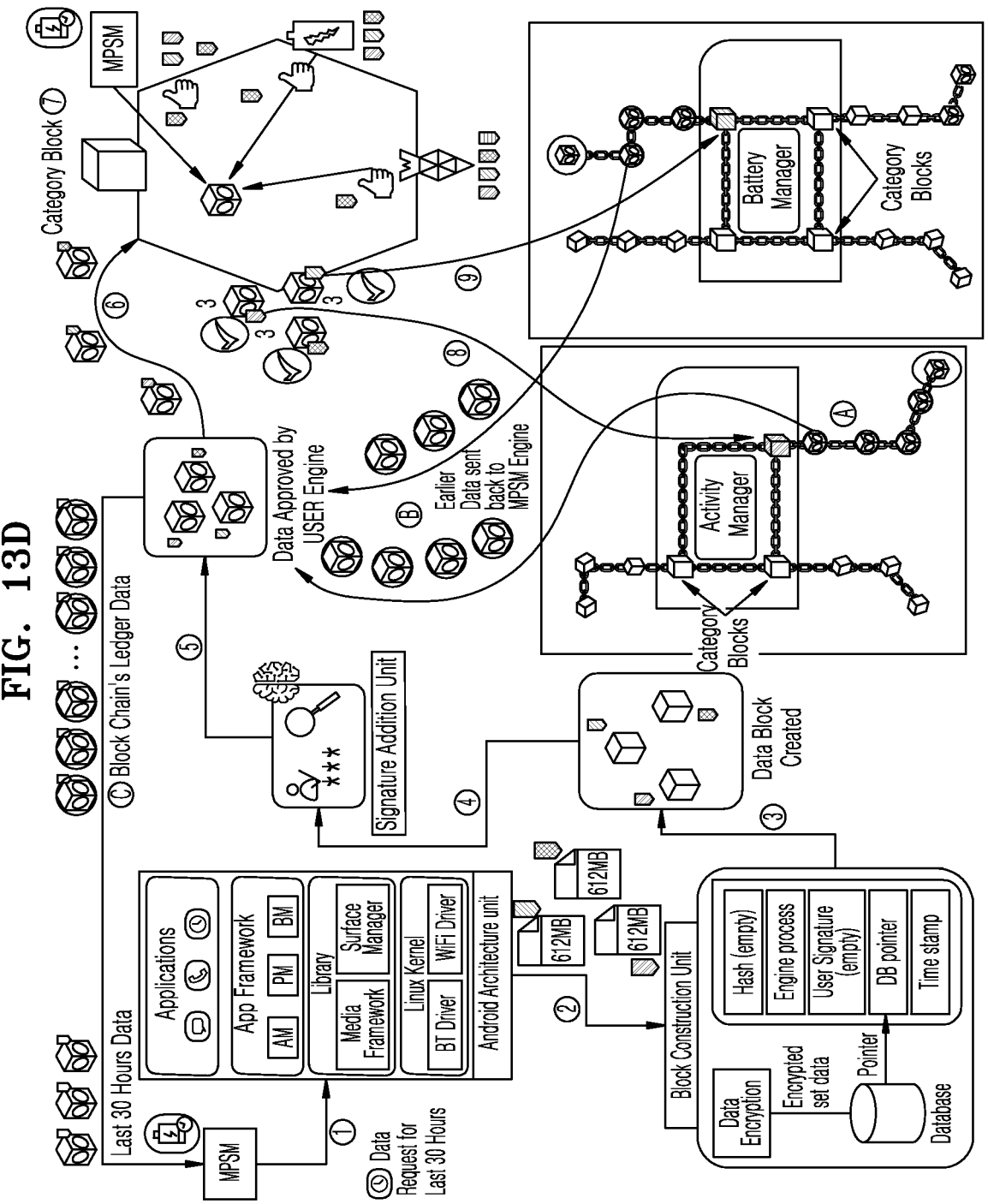

As shown in FIG. 13C, at operation 1, the MPSM engine requests data from the activity manager, the package manager, and the battery manager from the last 30 hours. At operation 2, the activity manager, the package manager, and the battery manager generates the data as requested by the MPSM engine and sends the data to block construction controller. At operation 3, the single data block is created using data from each activity manager, the package manager, and the battery manager.

At operation 4, each data block is sent to the signature addition controller for user approval on data sharing. At operation 5, all three blocks are approved by the user engine. The approved data blocks are shared to the requesting engine. At operation 6, three signature blocks are sent to the block chain validation controller. At operation 7, another engine in a similar category verifies this data using their tag if the data is useful for them or not. At operation 8, all three data blocks are validated. At operation 9, the blocks are added to their respective side chains of their category engine and their unit engine feeder chain.

At operation a, as the MPSM engine requests data for the first time in the new phone, all the ledger of category blocks are synced. At operation b, previous data blocks are sent to the user engine. At operation c, the user engine sends the data block to the MPSM engine.

Figure 13E:
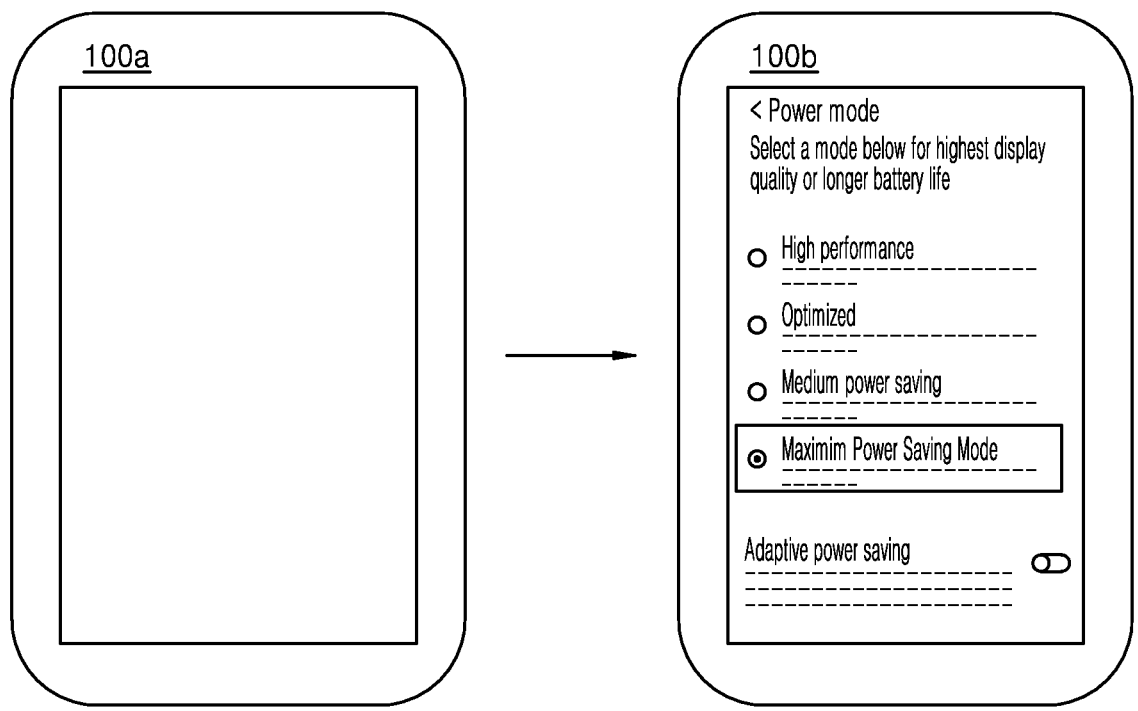
Figure 13E:
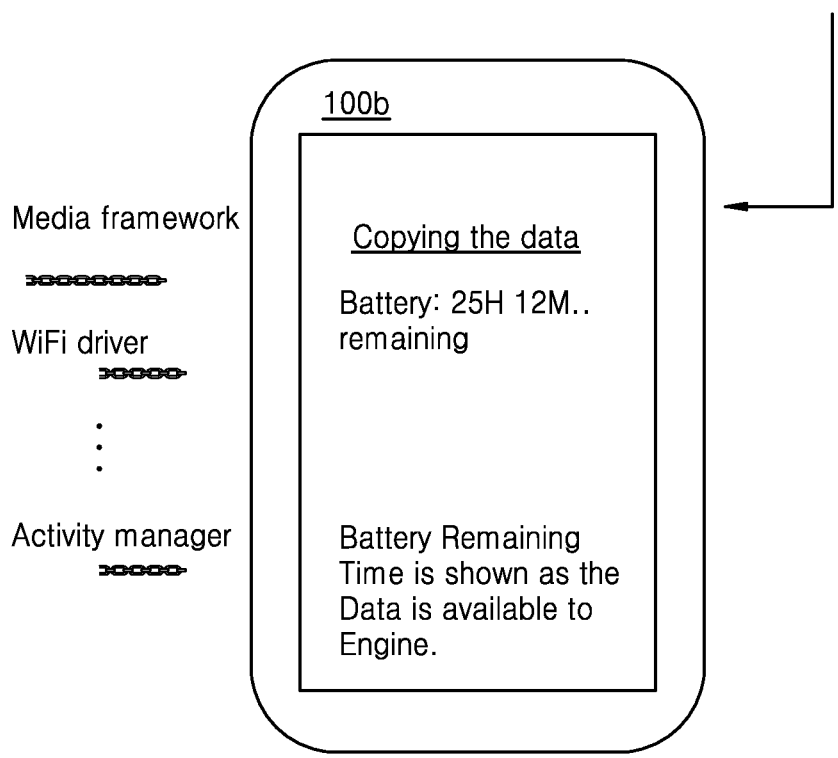
Figure 14:
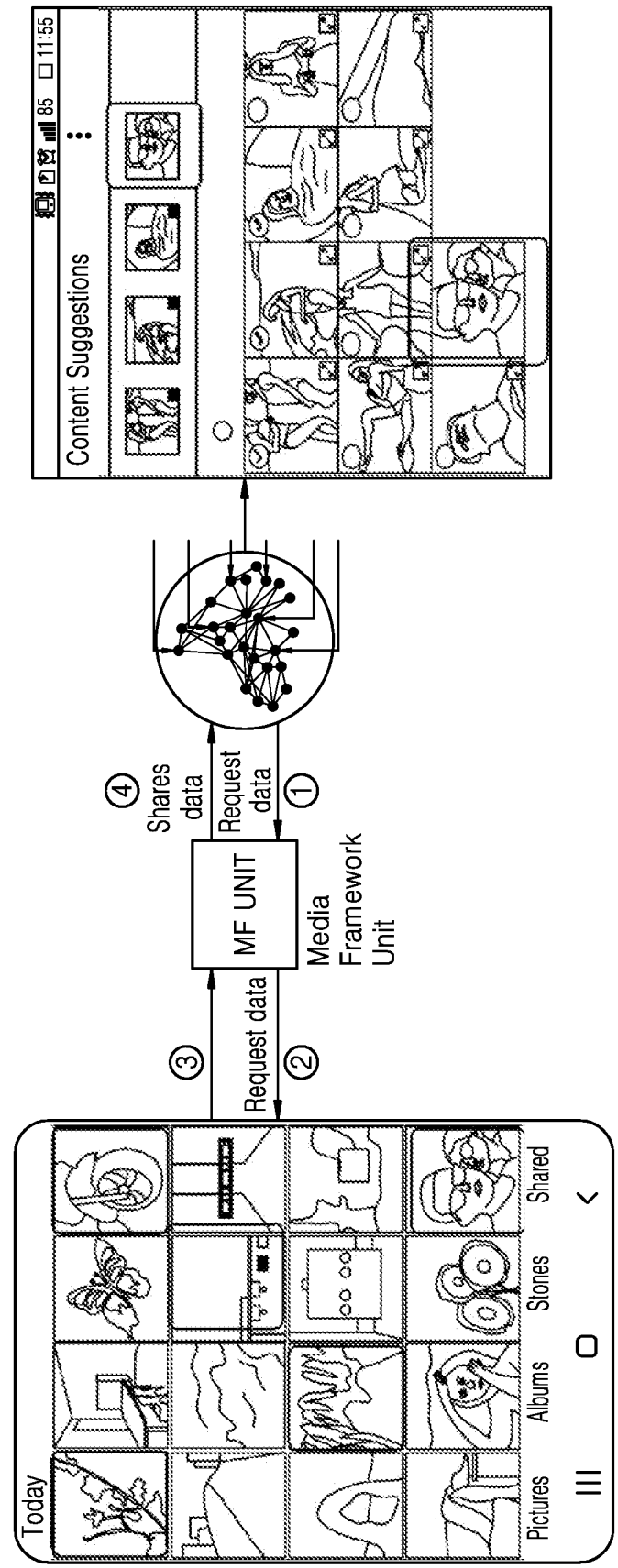
FIG. 14 is example illustration in which a plurality of images in the electronic device is segregated as private or not, according to the related art.

As shown in FIG. 13E, the first electronic device 100a transfers the data to the second electronic device 100b. In an embodiment, ML engine learning will also be transferred during copying data to the second electronic device 100b, so that user past learning can be used and provide a predication result. Hence, the ML engine can able to produce the battery estimation as data is available even if the ML engine is installed FIG. 14 illustrate a plurality of images that are segregated as private or not, in the related art. In the current scenario, all the images present in an electronic device in the related art are sent to an Alt-Z® engine to be segregated as private or not. The engine does not receive a user's personalized data and analyzes a large number of meaningless images which should not have been considered even for categorization purposes.

Figure 15:
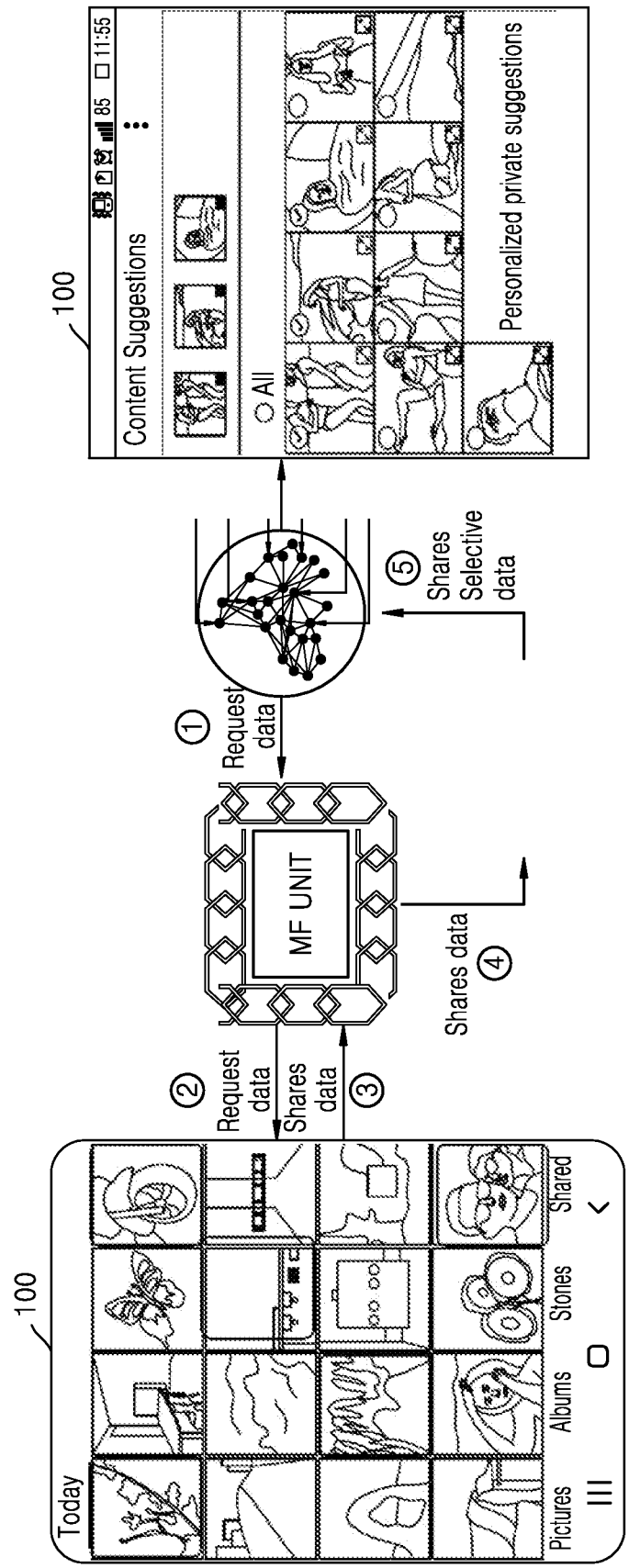
FIG. 15 is example illustration in which the plurality of images in the electronic device is segregated as private or not, according to an embodiment.

FIG. 15 is an example illustration in which the plurality of images in the electronic device 100 is segregated as private or not, according to an embodiment. In an embodiment, the images shared with the Alt-Z® engine are shared intelligently by giving them a user personalized segregation before sharing it to the Alt-Z® engine. It makes the engine more dynamic, personalized and efficient.

In an embodiment, when the Alt-Z® engine requests data from the media framework unit, only meaningful data which has the chance to be categorized as private by this particular user is analyzed by ALT-Z® engine. Specifically, each image requested by the ALT-Z® engine is provided to the user signature controller which decides whether the user wants to share this image with the on-device Alt-z engine or not. Thus user/an Automatic on device decision making engine can help only to pass meaningful data to the ALT-Z® engine and helps to improve of ALT-Z® engine's efficiency in terms of results and resource usage as well.

Figure 16:
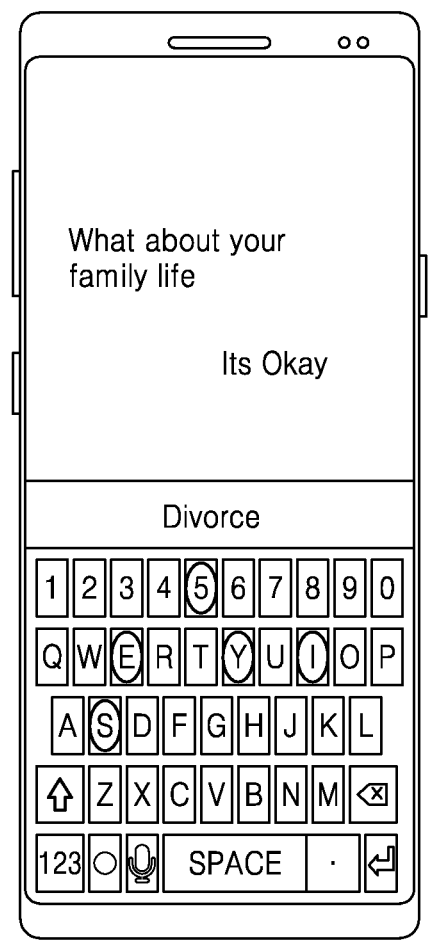
FIG. 16 is example illustration in which user's browsing data is available for model training even the data is private for user, according to the related art.

FIG. 16 is an example illustration in which user's browsing data is available for model training even the data is private for user, in the related art. While browsing on the Internet, a user of an electronic device in the related art searches for a divorce attorney on a browsing application. The ML machine associated with the chat application requests the browsing application to provide the searched data, and based on the request, the browsing application sends the requested data to the chat application, so when the user of the electronic device types letter "D" and the chat application predicts "divorce" and shows it on the chat application. Based on the existing method, the user's private data is shown in the normal scenario and the user does not want this.

Figure 17:
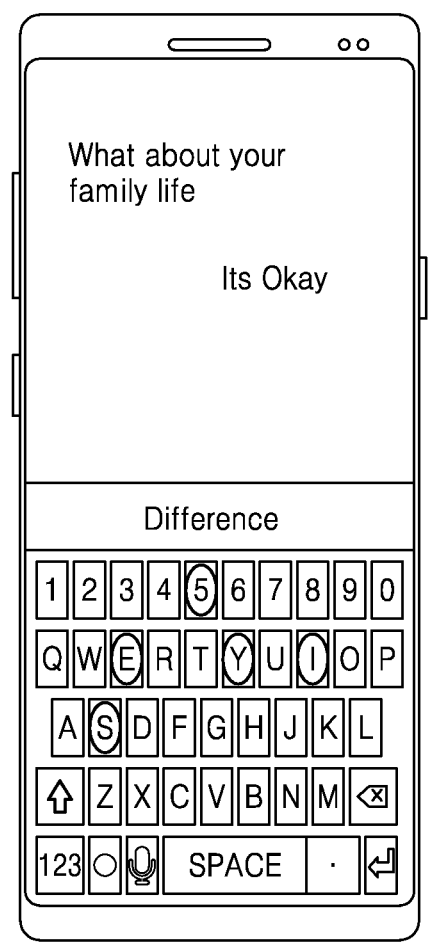
FIG. 17 is example illustration in which user's browsing data is not available for model training when the data is private for user, according to an embodiment.

FIG. 17 is an example illustration in which user's browsing data is not available for model training when the data is private for the user, according to an embodiment. Based on the method in the embodiment, the user data is not used for prediction without authentication. While browsing on the Internet, the user of the electronic device 100 searches the divorce attorney on the browsing application. The ML machine associated with the chat application request the browsing application to provide the searched data and based on the request, the browsing application sends the requested data into the block construction controller and the data block is sent for the user consent in the signature addition unit. Based on the user consent, the data block becomes private data that is not available for any engine unit. Based on the method in the embodiment, the user's private data is not shown in the normal scenario. This results in user privacy enhancement.

According to the embodiments of the present disclosure, security, privacy, and resource consumptions for AI & ML are enhanced with efficient, secure and traceable features of the block chain technology. The embodiments provide the security during access to confidential and private data by ML engine and provides user additional control for the private data.

The embodiments disclosed herein can be implemented using at least one network management function running on at least one hardware device.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for preventing data leakage in an electronic device, the method comprising:
    detecting a data request from a first machine learning (ML) engine of a plurality of ML engines that requests at least one framework application of a plurality of framework applications to provide data;
    identifying the data that is generated by the at least one framework application in response to the data request from the first ML engine;
    creating a plurality of data blocks based on the data generated by the at least one framework application, a first category of the first ML engine that is determined based on a communication pattern between the first ML engine and the at least one framework application, and a first tag associated with the first ML engine and the at least one framework application;
    determining whether the plurality of data blocks are valid to share with the first ML engine using an activity block chain associated with each of the plurality of framework applications;
    based on the plurality of data blocks being valid, sharing the plurality of data blocks with the first ML engine, as a valid set of data blocks; and
    based on the plurality of data blocks not being valid, discarding the plurality of data blocks, as an invalid set of data blocks, not to be shared with the first ML engine.

2. The method as claimed in claim 1, further comprises:
    based on the plurality of data blocks being valid, sending the valid set of data blocks to the plurality of framework applications; and
    updating the activity block chain associated with each of the plurality of framework applications based on the first category of the first ML engine, the first tag associated with the first ML engine and the at least one framework application associated with the valid set of data blocks.

3. The method as claimed in claim 1, further comprising creating the activity block chain associated with each of the plurality of framework applications, wherein the creating the activity block chain comprises:
    detecting a type of data exchange between the first ML engine and the at least one framework application associated with the first category;
    generating at least one tag for each ML engine belonging to the first category, among the plurality of ML engines, based on the type of the data exchange between the first ML engine and the at least one framework application associated with the first category; and
    creating the activity block chain associated with each of the plurality of framework applications based on the first category, the type of the data exchange between the first ML engine and the at least one framework application associated with the first category, and actual data allowed between the first ML engine and the at least one framework application associated with the first category.

4. The method as claimed in claim 3, wherein the categorizing the first ML engine into the first category based on the communication pattern between each of the plurality of ML engines and the at least one framework application comprises:
    detecting the plurality of framework applications installed on the electronic device;
    detecting the communication pattern between each of the plurality of ML engines and the at least one framework application;
    monitoring the communication pattern between the first ML engine and the at least one framework application; and
    categorizing the first ML engine having the same communication pattern with the at least one framework application into the first category.

5. The method as claimed in claim 3, wherein the creating the activity block chain associated with each of the plurality of framework applications based on the first category, the type of the data exchange between the first ML engine and the at least one framework application associated with the first category, and the actual data allowed between the first ML engine and the at least one framework application associated with the first category comprises:
    creating a category block chain based on the first category;
    creating a micro block chain based on the type of the data exchange between the ML engine and the at least one framework application associated with the first category, and the actual data allowed between the first ML engine and the at least one framework application associated with the first category; and
    creating the activity block chain based on the category block chain and the micro block chain.

6. The method as claimed in claim 5, wherein the data generated by the at least one framework application is stored in the micro block chain by encrypting the data and storing, in a memory of the electronic device, the encrypted data in association with the micro block chain using a pointer.

7. The method as claimed in claim 1, wherein the determining whether the plurality of data blocks are valid comprises:
    receiving at least one response from a user that allows data sharing with the first ML engine;
    creating a ML model to predict a user response regarding the data sharing by training the ML model using a parameter for sharing the data with the plurality of ML engines;
    automatically creating a user signature from the created ML model;
    generating a signed block comprising a private key based on the user signature; and
    determining whether the plurality of data blocks are valid to share with the first ML engine using the activity block chain associated with each of the plurality of framework applications based on the generated signed block.

8. The method as claimed in claim 7, wherein the parameter comprises at least one of a hash value, a process associated with the first ML engine, the user signature, storage information and time stamp.

9. The method as claimed in claim 1, wherein the determining whether the plurality of data blocks are valid comprises:
    automatically creating a user signature from a ML model, which is trained to predict a user response regarding the data sharing based on a parameter for sharing the data with the plurality of ML engines; and
    determining whether the plurality of data blocks are valid to share with the first ML engine based on the user signature.

10. The method as claimed in claim 5, wherein the category block chain comprises a plurality of category blocks indicating category information of each of the plurality of ML engines associated with the at least one framework application.

11. The method as claimed in claim 5, wherein each block of the category block chain acts as a root to the activity block chain.

12. An electronic device comprising:
a memory storing instructions; and
one or more processors configured to execute the instructions to:
detect a data request from a first machine learning (ML) engine of a plurality of ML engines that requests at least one framework application of a plurality of framework applications to provide data,
identify the data that is generated by the at least one framework application in response to the data request from the first ML engine,
create a plurality of data blocks based on the data generated by the at least one framework application, a first category of the first ML engine that is determined based on a communication pattern between the first ML engine and the at least one framework application, and a first tag associated with the first ML engine and the at least one framework application,
determine whether the plurality of data blocks are valid to share with the first ML engine using an activity block chain associated with each of the plurality of framework applications,
based on the plurality of data blocks being valid, share the plurality of data blocks with the first ML engine, as a valid set of data blocks; and
based on the plurality of data blocks not being valid, discard the plurality of data blocks, an invalid set of data blocks not to be shared with the first ML engine.

13. The electronic device as claimed in claim 12, wherein the one or more processors are further configured to execute the instructions to:
based on the plurality of data blocks being valid, send the valid set of data blocks to the plurality of framework applications; and
update the activity block chain associated with each of the plurality of framework applications based on the first category of the first ML engine, the first tag associated with the first ML engine and the at least one framework application associated with the valid set of data blocks.

14. The electronic device as claimed in claim 12, wherein the one or more processors are further configured to execute the instructions to:
detect a type of data exchange between the first ML engine and the at least one framework application associated with the first category;
generate at least one tag for each ML engine belonging to the first category, among the plurality of ML engines, based on the type of the data exchange between the first ML engine and the at least one framework application associated with the first category; and
create the activity block chain associated with each of the plurality of framework applications based on the first category, the type of the data exchange between the first ML engine and the at least one framework application associated with the first category, and actual data allowed between the first ML engine and the at least one framework application associated with the first category.

15. The electronic device as claimed in claim 14, wherein the one or more processors are further configured to execute the instructions to:
detect the plurality of framework applications installed on the electronic device;
detect the communication pattern between each of the plurality of ML engines and the at least one framework application;
monitor the communication pattern between the first ML engine and the at least one framework application; and
categorize the first ML engine having the same communication pattern with the at least one framework application into the first category.

16. The electronic device as claimed in claim 14, wherein the one or more processors are further configured to execute the instructions to:
create a category block chain based on the first category;
create a micro block chain based on the type of the data exchange between the ML engine and the at least one framework application associated with the first category, and the actual data allowed between the first ML engine and the at least one framework application associated with the first category; and
create the activity block chain based on the category block chain and the micro block chain.

17. The electronic device as claimed in claim 16, wherein the data generated by the at least one framework application is stored in the micro block chain by encrypting the data and storing, in the memory, the encrypted data in association with the micro block chain using a pointer.

18. The electronic device as claimed in claim 12, wherein the one or more processors are further configured to execute the instructions to:
receive at least one response from a user that allows data sharing with the first ML engine;
create a ML model to predict a user response regarding the data sharing by training the ML model using a parameter for sharing the data with the plurality of ML engines;
automatically create a user signature from the created ML model;
generate a signed block comprising a private key based on the user signature; and
determine whether the plurality of data blocks are valid to share with the first ML engine using the activity block chain associated with each of the plurality of framework applications based on the generated signed block.

19. The electronic device as claimed in claim 18, wherein the parameter comprises at least one of a hash value, a process associated with the first ML engine, the user signature, storage information and time stamp.

20. The electronic device as claimed in claim 12, wherein the plurality of framework applications are configured to access and control other applications installed on the electronic device.

* * * * *